(12) United States Patent
Masuike et al.

(10) Patent No.: US 11,163,066 B2
(45) Date of Patent: Nov. 2, 2021

(54) ELECTRONIC DEVICE, CONTROL METHOD, AND NON-TRANSITORY COMPUTER-READABLE RECORDING MEDIUM

(71) Applicant: KYOCERA Corporation, Kyoto (JP)

(72) Inventors: Isao Masuike, Machida (JP); Hideki Morita, Yokohama (JP); Koutaro Yamauchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 142 days.

(21) Appl. No.: 16/282,968

(22) Filed: Feb. 22, 2019

(65) Prior Publication Data

US 2019/0187292 A1    Jun. 20, 2019

Related U.S. Application Data

(63) Continuation of application No. PCT/JP2017/029912, filed on Aug. 22, 2017.

(30) Foreign Application Priority Data

Aug. 25, 2016 (JP) .............. JP2016-164683
Aug. 25, 2016 (JP) .............. JP2016-164809

(51) Int. Cl.
*G01S 19/03* (2010.01)
*G01S 19/14* (2010.01)
(Continued)

(52) U.S. Cl.
CPC .............. *G01S 19/03* (2013.01); *G01S 19/14* (2013.01); *G01S 19/16* (2013.01); *G01S 19/17* (2013.01);
(Continued)

(58) Field of Classification Search
CPC .......... G01S 19/03; G01S 19/14; G01S 19/16; G01S 19/17; G08B 21/02; G08B 21/0202; G08B 21/0269; G08G 1/16; H04M 1/00
(Continued)

(56) References Cited

U.S. PATENT DOCUMENTS 6,876,326 B2 *  4/2005  Martorana .............. G01S 1/022
                                              342/458
8,937,554 B2 *  1/2015  Kwan ................... A61B 5/1117
                                              340/686.6
(Continued)

FOREIGN PATENT DOCUMENTS

DE   10 2014 006 956 A1   11/2014
EP       1 043 599 A2     10/2000
(Continued)

*Primary Examiner* — Chuong P Nguyen
(74) *Attorney, Agent, or Firm* — Studebaker & Brackett PC

(57) ABSTRACT

An electronic device, a control method, and a non-transitory computer-readable recording medium are disclosed. In one embodiment, an electronic device comprises a position detector, a communication unit, and at least one processor. The position detector is configured to detect position information of the electronic device based on a signal output by a satellite. The communication unit is configured to communicate with another device. When the at least one processor determines that detection accuracy of the position detector has deteriorated when a detecting function of the position detector is valid, the at least one processor reduces communication with the another device.

8 Claims, 12 Drawing Sheets

(51) Int. Cl.
*G08B 21/02* (2006.01)
*G08G 1/16* (2006.01)
*H04M 1/00* (2006.01)
*G01S 19/16* (2010.01)
*G01S 19/17* (2010.01)

(52) U.S. Cl.
CPC .......... *G08B 21/02* (2013.01); *G08B 21/0269* (2013.01); *G08G 1/16* (2013.01); *H04M 1/00* (2013.01)

(58) Field of Classification Search
USPC .............. 342/357.4, 357.52, 357.54, 357.55; 340/539.13, 539.15
See application file for complete search history.

(56) References Cited

U.S. PATENT DOCUMENTS

| | | | | |
|---|---|---|---|---|
| 9,026,135 | B2* | 5/2015 | Takahashi | G01S 19/25 |
| | | | | 455/456.1 |
| 9,326,097 | B2* | 4/2016 | Sen | H04W 4/029 |
| 9,516,513 | B2* | 12/2016 | Sægrov | G01S 5/0072 |
| 9,823,356 | B2* | 11/2017 | Sambongi | G01S 19/34 |
| 10,009,910 | B2* | 6/2018 | Reis | H04W 52/243 |
| 10,424,199 | B2* | 9/2019 | Hamada | G08G 1/0967 |
| 10,645,535 | B2* | 5/2020 | Ueno | H04W 4/029 |
| 2008/0267150 | A1* | 10/2008 | Rofougaran | G01S 19/49 |
| | | | | 370/338 |
| 2008/0274713 | A1* | 11/2008 | Rofougaran | G01S 19/48 |
| | | | | 455/334 |
| 2009/0289844 | A1* | 11/2009 | Palsgrave | A01K 15/021 |
| | | | | 342/357.55 |
| 2010/0007552 | A1* | 1/2010 | Oda | G01S 19/48 |
| | | | | 342/357.43 |
| 2015/0091751 | A1 | 4/2015 | Sambongi | |
| 2016/0014554 | A1 | 1/2016 | Sen et al. | |
| 2016/0146616 | A1* | 5/2016 | Ren | G01C 21/165 |
| | | | | 701/409 |
| 2016/0351049 | A1 | 12/2016 | Hamada et al. | |
| 2019/0268737 | A1* | 8/2019 | Ueno | G01S 19/14 |

FOREIGN PATENT DOCUMENTS

| | | |
|---|---|---|
| JP | 2000134293 A | 5/2000 |
| JP | 2002-329223 A | 11/2002 |
| JP | 2009-267770 A | 11/2009 |
| JP | 2012-118014 A | 6/2012 |
| JP | 201344651 A | 3/2013 |
| JP | 2013-164777 A | 8/2013 |
| JP | 2014-225069 A | 12/2014 |
| JP | 2014533443 A | 12/2014 |
| JP | 2015-068777 A | 4/2015 |
| WO | 2015/122406 A1 | 8/2015 |

* cited by examiner

FIG. 2

| | | CHARGE STATE | |
|---|---|---|---|
| | | CURRENTLY-CHARGING STATE | POST-CHARGE STATE |
| MOVEMENT STATE OF ELECTRONIC DEVICE | STOPPING STATE | USER IS IN SAFE PLACE | USER IS IN SAFE PLACE |
| | MOTIONLESS STATE | USER IS IN SAFE PLACE | USER IS IN SAFE PLACE |
| | MOVING STATE ON FIRST CONVEYANCE | USER IS IN SAFE PLACE | USER IS IN SAFE PLACE |
| | MOVING STATE ON SECOND CONVEYANCE | USER IS NOT IN SAFE PLACE | USER IS NOT IN SAFE PLACE |
| | RUNNING STATE | USER IS NOT IN SAFE PLACE | USER IS NOT IN SAFE PLACE |
| | WALKING STATE | USER IS NOT IN SAFE PLACE | USER IS NOT IN SAFE PLACE |

9F

F I G. 5

| | | CHARGE STATE | |
|---|---|---|---|
| | | CURRENTLY-CHARGING STATE | POST-CHARGE STATE |
| MOVEMENT STATE OF ELECTRONIC DEVICE | STOPPING STATE | INDOOR PLACE | INDOOR PLACE |
| | MOTIONLESS STATE | INDOOR PLACE | INDOOR PLACE |
| | MOVING STATE ON FIRST CONVEYANCE | OUTDOOR PLACE (SAFE) | — |
| | MOVING STATE ON SECOND CONVEYANCE | OUTDOOR PLACE | — |
| | RUNNING STATE | OUTDOOR PLACE | — |
| | WALKING STATE | — | — |

ELECTRONIC DEVICE, CONTROL METHOD, AND NON-TRANSITORY COMPUTER-READABLE RECORDING MEDIUM

CROSS-REFERENCE TO RELATED APPLICATION

The present application is a continuation based on PCT Application No. PCT/JP2017/029912 filed on Aug. 22, 2017, which claims the benefit of Japanese Application No. 2016-164683, filed on Aug. 25, 2016, and Japanese Application No. 2016-164809, filed on Aug. 25, 2016. PCT Application No. PCT/JP2017/029912 is entitled "ELECTRONIC DEVICE, CONTROL METHOD, AND CONTROL PROGRAM", and both Japanese Application No. 2016-164683 and No. 2016-164809 are entitled "ELECTRONIC DEVICE, CONTROL METHOD, AND CONTROL PROGRAM". The content of which are incorporated by reference herein in their entirety.

FIELD

Embodiments of the present disclose generally relate to an electronic device.

BACKGROUND

Various technologies relating to an electronic device have hitherto been proposed.

SUMMARY

An electronic device, a control method, and a non-transitory computer-readable recording medium are disclosed. In one embodiment, an electronic device comprises a position detector, a communication unit, and at least one processor. The position detector is configured to detect position information of the electronic device based on a signal output by a satellite. The communication unit is configured to communicate with another device. When the at least one processor determines that detection accuracy of the position detector has deteriorated when a detecting function of the position detector is valid, the at least one processor reduces communication with the another device.

In one embodiment, a control method is a control method of an electronic device comprising a position detector and a communication unit. The control method comprises detecting position information of the electronic device using the position detector, and based on a signal output by a satellite, and reducing communication of the communication unit with another device when it is determined that detection accuracy of the position detector has deteriorated when detection of the position detector is valid.

In one embodiment, a non-transitory computer-readable recording medium is a non-transitory computer-readable recording medium that stores a control program. The control program is configured to control an electronic device, comprising a position detector and a communication unit, to execute processes of detecting position information of the electronic device using the position detector, and based on a signal output by a satellite, and reducing communication of the communication unit with another device when it is determined that detection accuracy of the position detector has deteriorated when detection of the position detector is valid.

BRIEF DESCRIPTION OF THE DRAWINGS

FIG. 2 illustrates a diagram showing one example of estimation data.

FIG. 5 illustrates a diagram showing one example of the estimation data.

DETAILED DESCRIPTION

A plurality of embodiments for carrying out an electronic device, a control method, and a non-transitory computer-readable recording medium according to the present disclose are described in detail with reference to the drawings. Examples of the electronic device include, but not limited to, a smartphone, a mobile phone, a wearable device, a tablet, a portable personal computer, a digital camera, a media player, an electronic book reader, a navigator, and a game machine. In the following description, the same reference symbols may be given to like components. Further, overlapping description may be omitted.

First Example

Figure 1:
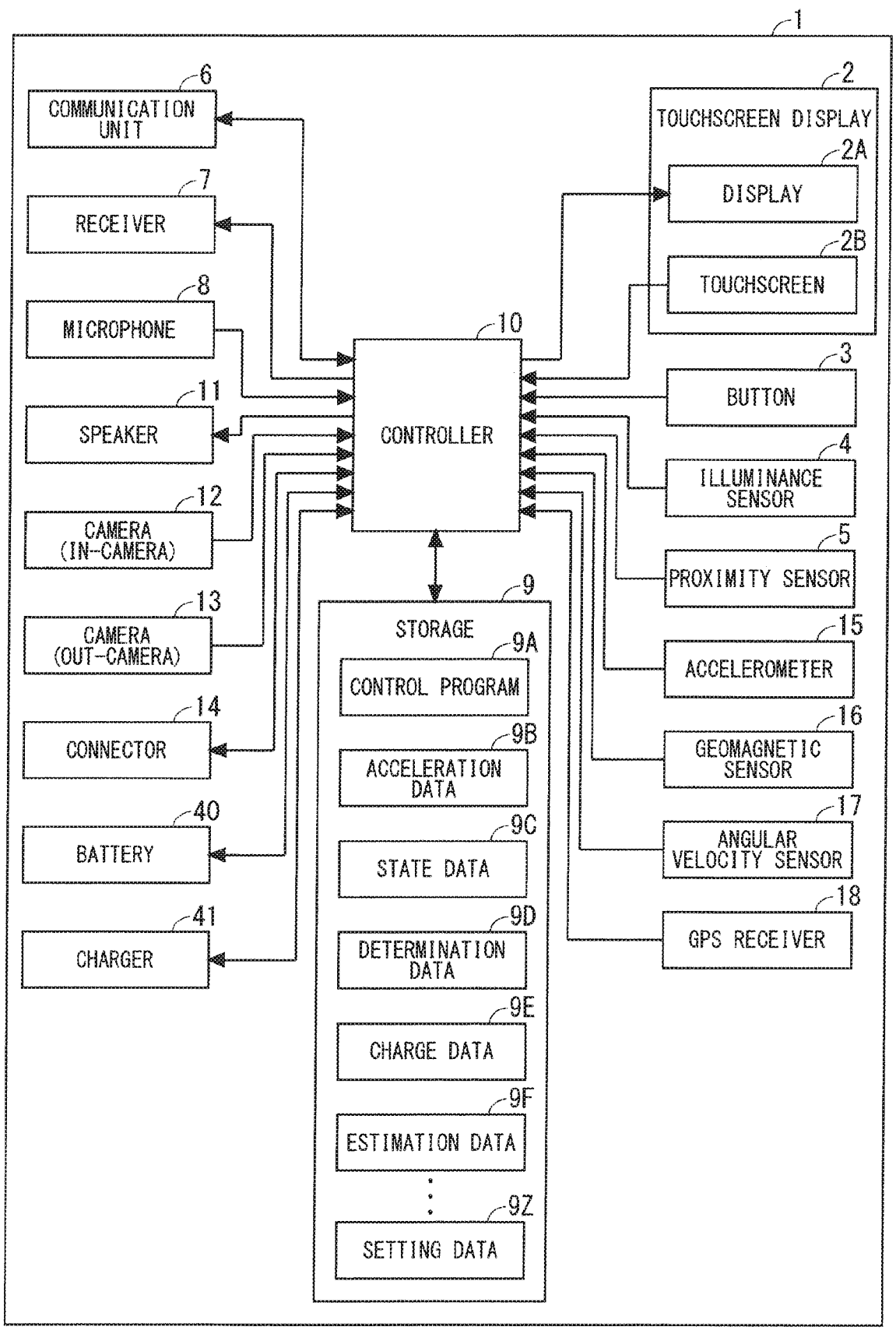
FIG. 1 illustrates a block diagram showing one example of a functional configuration of an electronic device.

With reference to FIG. 1, one example of a functional configuration of an electronic device 1 according to one example is described. FIG. 1 illustrates a block diagram showing one example of a functional configuration of the electronic device 1.

As illustrated in FIG. 1, the electronic device 1 comprises a touch screen display 2, one or more buttons 3, an illuminance sensor 4, a proximity sensor 5, a communication unit 6, a receiver 7, a microphone 8, a storage 9, a controller 10, a speaker 11, a camera 12, a camera 13, a connector 14, an accelerometer 15, a geomagnetic sensor 16, an angular velocity sensor 17, a global positioning system (GPS) receiver 18, a battery 40, and a charger 41. The electronic device 1 may be hereinafter referred to as a "subject device."

The touch screen display 2 comprises a display 2A and a touch screen 2B. The display 2A and the touch screen 2B may be located in an overlapping manner, located side by side, or located away from each other, for example. If the display 2A and the touch screen 2B are located in an overlapping manner, for example, one or more side of the display 2A need not extend along any of the sides of the touchscreen 2B.

The display 2A comprises a display device such as a liquid crystal display (LCD), an organic electro-luminescence display (OELD), or an inorganic electro-luminescence display (IELD). The display 2A can display an object such as a letter, an image, a symbol, and graphics on a screen.

The touch screen 2B can detect contact or proximity of one or more fingers, one or more pens, one or more stylus pens, or the like on or toward the touch screen 2B. When one or more fingers, one or more pens, one or more stylus pens, or the like comes in contact with or approaches the touch screen 2B, the touch screen 2B can detect the position thereof on the touch screen 2B. The finger(s), pen(s), stylus pen(s), or the like detected by the touch screen 2B may be referred to as a "finger." In one embodiment, the touch screen 2B can adopt an electrostatic capacitance method, a resistance film method, or a load detection method as a detection method as appropriate.

The controller 10 can distinguish types of gestures based on a detection result of the touch screen 2B. Examples of the detection result include the number of times of contact, the position where contact is detected, change in the position where contact is detected, the length of time in which contact is detected, a time interval between when contact is detected, and the number of times contact is detected. The electronic device 1 comprising the controller 10 can perform operation that can be performed by the controller 10. In other words, it can be said that the electronic device 1 performs operation performed by the controller 10. The gesture is an operation performed on the touch screen 2B using a finger. The operation performed on the touch screen 2B may be performed on the touch screen display 2 comprising the touch screen 2B. Examples of the gestures distinguished by the controller 10 via the touch screen 2B include, but not limited to, touch, long touch, release, swipe, tap, double tap, long tap, drag, flick, pinch in, and pinch out.

The button 3 can receive operation input from a user. Upon receiving operation input from a user, the button 3 notifies the controller 10 that the button 3 has received operation input. There may be one button 3 or a plurality of buttons 3.

The illuminance sensor 4 can detect illuminance. The illuminance is a value of a flux of light that impinges upon a unit area of a measurement surface of the illuminance sensor 4. The illuminance sensor 4 may be used to adjust luminance of the display 2A, for example.

The proximity sensor 5 can detect the presence of a nearby object in a non-contact manner. The proximity sensor 5 detects the presence of an object based on change in a magnetic field, change in a returning time period of a reflected wave of an ultrasonic wave, or the like. The proximity sensor 5 may be used to detect approach of a face of a user toward the display 2A, for example. The illuminance sensor 4 and the proximity sensor 5 may be formed as one sensor. The illuminance sensor 4 may be used as a proximity sensor.

The communication unit 6 can wirelessly communicate. The communication unit 6 can support wireless communication standards. Examples of the wireless communication standards supported by the communication unit 6 include communication standards for a cellular phone, such as 2G, 3G, 4G, and 5G, and a communication standard for short-range wireless communication. Examples of the communication standards for a cellular phone include Long Term Evolution (LTE), Wideband Code Division Multiple Access (W-CDMA), Worldwide Interoperability for Microwave Access (trademark) (WiMAX), CDMA2000, Personal Digital Cellular (PDC), Global System for Mobile Communications (trademark) (GSM), and Personal Handy-phone System (PHS). Examples of the communication standard for short-range wireless communication include IEEE802.11 (IEEE stands for The Institute of Electrical and Electronics Engineers, Inc.), Bluetooth (trademark), Infrared Data Association (IrDA), Near Field Communication (NFC), and Wireless Personal Area Network (WPAN). Examples of the communication standard for WPAN include ZigBee (trademark), Digital Enhanced Cordless Telecommunications (DECT), Z-Wave, and Wireless Smart Utility Network (WiSun). The communication unit 6 may support one or more of the above-mentioned communication standards.

The communication unit 6 can further support a plurality of communication standards in order to enable communication with a roadside unit that is installed near a road, an intersection, or the like, for example. The intersection includes a portion where two or more roads intersect with each other. Examples of the communication standards include Dedicated Short Range Communication (DSRC) that enables two-way communication. In one example, the communication unit 6 can receive a radio wave sent out by a roadside unit within a predetermined communication area. The communication unit 6 can send out a radio wave that can be received by a roadside unit, another electronic device, or the like, for example. The predetermined communication area may include an area around a road, for example. The predetermined communication area may include an intersection and a parking lot, for example.

The receiver 7 can output a sound signal transmitted from the controller 10 as sound. The receiver 7 can output sound of a video and sound of music played in the electronic device 1, and a voice of a person to whom the user is speaking during a call, for example. The microphone 8 can convert an incoming voice of the user or the like into a sound signal, and can transmit the converted sound signal to the controller 10.

The storage 9 can store a program and data. The storage 9 may be used as a working area where a processing result of the controller 10 is temporarily stored. The storage 9 may comprise any non-transitory storage medium such as a semiconductor storage medium and a magnetic storage medium. The storage 9 may comprise a plurality of types of storage media. The storage 9 may comprise a combination of a storage medium, such as a memory card, an optical disc, and a magneto-optical disk, and a reader for the storage medium. The storage 9 may comprise a storage device used as a temporary storage area, such as random access memory (RAM).

A program stored in the storage 9 comprises an application executed in the foreground or in the background, and a basic program that supports operation of the application. A screen of the application is displayed on the display 2A when the application is executed in the foreground, for example. Examples of the basic program include an OS. The application and the basic program may be installed in the storage 9 by means of wireless communication of the communication unit 6 or non-transitory storage medium.

The storage 9 can store, for example, a control program 9A, acceleration data 9B, state data 9C, determination data 9D, charge data 9E, estimation data 9F, setting data 9Z, etc. The acceleration data 9B includes information about an acceleration value detected by the accelerometer 15. The state data 9C includes information indicating a movement state of the electronic device 1. The determination data 9D includes information used to determine a movement state of the electronic device 1. The charge data 9E includes information about the battery 40. The estimation data 9F includes information about the relationship between a charge state of the battery 40 and a movement state of the subject device. The setting data 9Z includes information about various settings relating to operation of the electronic device 1.

The control program 9A can provide a function relating to various types of control to activate the electronic device 1. For example, the control program 9A can enable making a call by controlling the communication unit 6, the receiver 7, the microphone 8, etc. The function provided by the control program 9A includes a function of determining a plurality of movement states of the subject device achieved by controlling the accelerometer 15 etc.

Examples of the plurality of movement states of the electronic device 1 include a stopping state, a motionless state, a walking state, a running state, a moving state on a first conveyance, and a moving state on a second conveyance. The stopping state includes a state where the user carrying the subject device is stopping. The motionless state includes a state where the subject device is laid down. The walking state includes a state where the user carrying the subject device is walking. The running state includes a state where the user carrying the subject device is running. The moving state on a first conveyance includes a state where the user carrying the subject device is moving on a first conveyance. Examples of the first conveyance include conveyances using motive power other than a bicycle, such as an automobile, a train, a bus, and an airplane. The first conveyance includes a conveyance having a low probability of being involved in an accident where the user him/herself directly collides with an automobile, and an accident where the user him/herself has a minor collision with an automobile. The moving state on a second conveyance includes a state where the user carrying the subject device is moving on a bicycle and on a motorcycle. For example, the second conveyance includes a conveyance that may be involved in an accident where the user him/herself directly collides with an automobile, and an accident where the user him/herself has a minor collision with an automobile.

The control program 9A can provide a function of estimating whether the user is in a safe place based on a charge state of the battery 40 and a movement state of the subject device. Examples of the safe place include an indoor place and the inside of a vehicle. Examples of an unsafe place include an outdoor place. There is a low probability that the user in an indoor place runs out to a road or the like. The user in an outdoor place may run out to a road or the like. For example, a driver driving an automobile needs to pay attention to a person who is not in a safe place as a dangerous object, but has less need to pay attention to a person who is in a safe place as a dangerous object. The control program 9A can provide a function of notifying an external electronic device about the presence of the user based on an estimation result as to whether the user is in a safe place.

One example describes a case where the electronic device 1 regards a place where the driver or the like need not be notified about the presence of the user as a safe place, but this is not restrictive. For example, the electronic device 1 may regard a safe place as a place inside the above-mentioned first conveyance.

The acceleration data 9B includes a plurality of pieces of acceleration information that are transmitted to the controller 10 as a detection result of the accelerometer 15. The acceleration data 9B can indicate a plurality of pieces of acceleration information in time series. Examples of the pieces of acceleration information include time and an acceleration value. The time indicates time at which a direction and magnitude of acceleration are detected by the accelerometer 15. The acceleration value indicates values of a direction and magnitude of acceleration detected by the accelerometer 15.

For example, a detection result of the accelerometer 15 is transmitted to the controller 10. The detection result includes an acceleration value in an X-axis direction, an acceleration value in a Y-axis direction, an acceleration value in a Z-axis direction, and a vector value in which those acceleration values are synthesized. The controller 10 can keep a log of the detection result of the accelerometer 15 in the acceleration data 9B in the storage 9. The controller 10 may calculate the synthesized vector value by computing the acceleration value in the X-axis direction, the acceleration value in the Y-axis direction, and the acceleration value in the Z-axis direction.

The state data 9C includes information indicating the current movement state of the subject device. Examples of the movement state include a stopping state, a motionless state, a walking state, a running state, a moving state on a first conveyance, and a moving state on a second conveyance. The controller 10 can update the state data 9C in accordance with detection of change in the movement state of the subject device.

The determination data 9D includes acceleration patterns that individually correspond to a respective plurality of movement states of the subject device. Each of the acceleration patterns included in the determination data 9D exhibits a characteristic pattern of acceleration detected by the accelerometer 15 when the subject device is in a movement state that corresponds to the acceleration pattern. The acceleration pattern may be a pattern of acceleration that is actually detected by the accelerometer 15, or may be a predicted pattern of acceleration that will be detected by the accelerometer 15. The acceleration pattern is stored so as to correspond to the above-mentioned data containing the log of the synthesized vector value. The determination data 9D includes acceleration patterns that correspond to respective states of the stopping state, the motionless state, the walking state, the running state, the moving state on a first conveyance, and the moving state on a second conveyance, for example.

For example, the controller 10 can compare a pattern of the synthesized vector of the acceleration data 9B and an acceleration pattern of the determination data 9D. Then, the controller 10 can determine that a movement state associated with an acceleration pattern that matches the pattern of the synthesized vector of the acceleration data 9B is the current movement state of the electronic device 1. Note that the matching of patterns includes complete matching and matching at a predetermined ratio.

The charge data 9E includes information indicating a charge state of the battery 40. Examples of the charge state include a currently-charging state and a post-charge state. The currently-charging state includes a state where the battery 40 is being charged, for example. The post-charge state includes a state where the battery 40 is fully charged, and a state where the charge of the battery 40 is interrupted, for example. The post-charge state may include a state until a predetermined period of time elapses from the time when the charge is finished, for example. The post-charge state may include a state until walking in a predetermined number of steps of the user is detected from the time when the charge is finished, for example. The post-charge state may include a state until walking movement or movement on a conveyance is detected from the time when the charge is finished, for example. The controller 10 updates the charge data 9E in accordance with detection of change in the charge state.

The estimation data 9F includes information to estimate whether the user is in a safe place based on a charge state of the battery 40 and a movement state of the subject device. The estimation data 9F will be described later in detail.

The setting data 9Z includes various pieces of data used for processing executed based on the functions provided by the control program 9A etc.

The controller 10 can implement various functions by integrally controlling the operation of the electronic device 1. The controller 10 comprises an arithmetic processor. The arithmetic processor comprises at least one processor for providing control and processing capability to perform various functions as described in detail below. In accordance with various embodiments, the at least one processor may be implemented as a single integrated circuit (IC) or as multiple communicatively coupled IC's and/or discrete circuits. It is appreciated that the at least one processor can be implemented in accordance with various known technologies.

In one embodiment, the processor comprises one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In one example, the arithmetic processor may comprise, but not limited to, a central processing unit (CPU), a system-on-a-chip (SoC), a micro control unit (MCU), a field-programmable gate array (FPGA), and a coprocessor, for example. The SoC may be integrated with another component such as the communication unit 6.

The controller 10 can execute a command that is contained in the program stored in the storage 9. The controller 10 can refer to the data stored in the storage 9 as necessary. The controller 10 controls a function unit in accordance with the data and the command. The controller 10 can implement various functions by controlling the function unit. For example, the function unit comprises, but not limited to, the display 2A, the communication unit 6, the receiver 7, and the speaker 11. The controller 10 may change control in accordance with a detection result of a detection unit. For example, the detection unit comprises, but not limited to, the touch screen 2B, the button 3, the illuminance sensor 4, the proximity sensor 5, the microphone 8, the camera 12, the camera 13, the accelerometer 15, the geomagnetic sensor 16, the angular velocity sensor 17, and the GPS receiver 18.

For example, the controller 10 can execute various types of control, such as changing information displayed on the display 2A in accordance with the gesture distinguished via the touch screen 2B, by executing the control program 9A.

The controller 10 can cooperate with the accelerometer 15, the geomagnetic sensor 16, the angular velocity sensor 17, and the GPS receiver 18 by executing the control program 9A. The controller 10 can execute processing of determining a movement state the subject device based on a detection result of the accelerometer 15. The controller 10 can execute processing of detecting a charge state of the battery 40 by executing the control program 9A.

The speaker 11 can output a sound signal transmitted from the controller 10 as sound. The speaker 11 may output a ringtone and music, for example. One of the receiver 7 and the speaker 11 may have a function of the other.

The camera 12 and the camera 13 can convert a captured image into an electrical signal. The camera 12 may be an in-camera that captures an object facing the display 2A. The camera 13 may be an out-camera that captures an object facing a surface opposite to the display 2A. The camera 12 and the camera 13 may be mounted to the electronic device 1 as a camera unit allowing switchable use of the in-camera and the out-camera in a functionally and physically integrated state.

The connector 14 is a terminal to which another device is connected. The connector 14 may be a general terminal, such as a Universal Serial Bus (USB), a High-Definition Multimedia Interface (trademark) (HDMI), Light Peak (Thunderbolt (trademark)), and an earphone-microphone connector. The connector 14 may be a dedicated terminal, such as a dock connector. Examples of the device to be connected to the connector 14 include, but not limited to, an external power supply, an external storage, a speaker, and a communication device.

The accelerometer 15 can detect a direction and magnitude of acceleration acting on the electronic device 1. The accelerometer 15 can send out a detected acceleration value to the controller 10. The controller 10 may detect change in the movement state of the subject device based on the direction and magnitude of the acceleration detected by the accelerometer 15, or an acceleration pattern including time-series change in the direction and magnitude of the acceleration.

The geomagnetic sensor 16 can detect a direction (azimuth) of the electronic device 1 by measuring geomagnetism, for example. The geomagnetic sensor 16 can send out a detected geomagnetic value to the controller 10. The geomagnetic sensor 16 may be of either a two-axis type or a three-axis type. The geomagnetic sensor 16 may detect a direction and magnitude of a magnetic field. The controller 10 can detect a moving direction of the user based on the geomagnetic value detected by the geomagnetic sensor 16.

The angular velocity sensor 17 can measure magnitude and a direction of angular velocity of the electronic device 1, for example. The angular velocity sensor 17 can send out a detected angular velocity value to the controller 10. The controller 10 can detect change in the direction of the electronic device 1 based on the magnitude and direction of the angular velocity detected by the angular velocity sensor 17, or an angular velocity pattern including time-series change in the direction and magnitude of the angular velocity. For example, the controller 10 can change the azimuth of the electronic device 1 based on the change in the direction of the electronic device 1 in an environment where the geomagnetism cannot be detected etc.

The GPS receiver 18 can detect the current position of the electronic device 1. The GPS receiver 18 can receive a radio wave signal in a predetermined frequency band from GPS satellites, perform demodulation processing on the received radio wave signal, and send out the processed signal to the controller 10. One example describes a case where the electronic device 1 comprises a GPS receiver 18, but this is not restrictive. For example, the electronic device 1 may comprise a receiver that receives a radio wave signal from a positioning satellite other than GPS satellites. For example, the electronic device 1 may detect the current position based on a base station with which the communication unit 6 uses wireless communication. For example, the electronic device 1 may detect the current position using a plurality of methods in combination.

The controller 10 may use outputs of the accelerometer 15, the geomagnetic sensor 16, and the angular velocity sensor 17 in combination. If outputs of a plurality of sensors are used in combination, the electronic device 1 can execute control reflecting the motion of the subject device at a high level by using the controller 10. The accelerometer 15, the geomagnetic sensor 16, and the angular velocity sensor 17 may be used as a single motion sensor.

Some or all of the programs and the pieces of the data stored in the storage 9 in FIG. 1 may be downloaded from another device by means of wireless communication of the communication unit 6. Some or all of the programs and the pieces of the data stored in the storage 9 in FIG. 1 may be stored in a non-transitory storage medium that can be read by a reader comprised in the storage 9. Some or all of the programs and the pieces of the data stored in the storage 9 in FIG. 1 may be stored in a non-transitory storage medium that can be read by a device to be connected to the connector 14. Examples of the non-transitory storage medium include, but not limited to, an optical disc such as a CD (trademark), a DVD (trademark), and a Blu-ray (trademark), a magneto-optical disk, a magnetic storage medium, a memory card, and a solid-state storage medium.

The battery 40 comprises a rechargeable battery. The battery 40 can supply stored electric power to each part of the electronic device 1 requiring electric power, such as the controller 10. The part that has received electric power from the battery 40 is activated by the electric power.

The charger 41 can control charge operation of the battery 40. The charger 41 includes a function of detecting a state whether electric power can be supplied from the connector 14 to the battery 40. For example, the charger 41 can detect a state in which electric power can be supplied from the connector 14 to the battery 40 when an external power supply is connected to the connector 14. Examples of the external power supply include an AC adapter, an electrical outlet, and a mobile battery. For example, the charger 41 can detect a state in which electric power can be supplied to the battery 40 with use of a sensor that detects a current or a voltage flowing through an electrical wire between the connector 14 and the battery 40. The charger 41 can detect whether electric power is supplied from an external power supply to the battery 40, irrespective of whether the external power supply gains electric power via an AC adapter, an electrical outlet, or the like, or whether the external power supply gains electric power from a mobile battery (a storage battery). The charger 41 can send out charge information of the battery 40 to the controller 10. The charge information includes the charge state of the battery 40, the remaining level of electric power, the date and time when the charge was finished, etc., for example.

One example describes a case where, in the electronic device 1, the battery 40 is charged from an external power supply via the connector 14, but this is not restrictive. For example, the charger 41 may receive electric power in a non-contact manner using a charging coil, and may charge the battery 40 with the received electric power. For example, the electronic device 1 may be charged by a dedicated charging cradle. In this case, the charger 41 may detect whether the electronic device 1 is supported at a predetermined position of a charging cradle in a predetermined posture with use of a contact sensor or the like. For example, there is a high probability that the user is in a safe place such as a home and an office when the user charges the electronic device 1 using a charging cradle. Therefore, the electronic device 1 can enhance accuracy of determining a charge state by determining that the electronic device 1 is in a currently-charging state when charged by a charging cradle.

FIG. 2 illustrates a diagram showing one example of the estimation data 9F. With reference to FIG. 2, one example of a relationship between the charge state of the battery 40 and the movement state of the subject device indicated by the estimation data 9F is described.

For example, if the charge state of the electronic device 1 is a currently-charging state and the movement state of the subject device is a stopping state or a motionless state, the user may be in a safe place such as an indoor place and an underground place. For example, if the charge state of the electronic device 1 is a currently-charging state and the movement state is a moving state on a first conveyance, the user may be in a safe place such as the inside of a conveyance. For example, if the electronic device 1 can be charged by a mobile battery, the electronic device 1 may be charged even if the movement state is a walking state or a running state. Specifically, if the charge state of the electronic device 1 is a currently-charging state and the movement state is a moving state on a second conveyance (e.g., a bicycle), a running state, or a walking state, the user may not be in a safe place.

In one example illustrated in FIG. 2, the estimation data 9F indicates that it can be estimated that the user is in a safe place if the charge state is a currently-charging state and the movement state of the subject device is either a stopping state, a motionless state, or a moving state on a first conveyance. The estimation data 9F indicates that it can be estimated that the user is not in a safe place if the charge state is a currently-charging state and the movement state of the subject device is either a moving state on a second conveyance, a running state, or a walking state. The estimation data 9F indicates that it can be estimated that the user is in a safe place if the charge state is a post-charge state and the movement state of the subject device is either a stopping state, a motionless state, or a moving state on a first conveyance. The estimation data 9F indicates that it can be estimated that the user is not in a safe place if the charge state is a post-charge state and the movement state of the subject device is either a moving state on a second conveyance, a running state, or a walking state.

The electronic device 1 can estimate whether the user of the subject device is in a safe place based on the charge state of the battery 40 and the movement state of the subject device by referring to the estimation data 9F. The electronic device 1 can enhance accuracy of estimating an environment around the subject device by combining detection results of the charge state of the battery 40 and the movement state of the subject device. The electronic device 1 can improve a use method of the determined movement state of the subject device. The electronic device 1 can estimate an environment around the subject device even in a place where the current position of the subject device cannot be detected by regarding the start of the charge of the battery 40 etc. as a trigger.

One example describes a case where the estimation data 9F can estimate that the user is not in a safe place if the movement state of the subject device is a walking state and the charge state is a currently-charging state, but this is not restrictive. For example, if the movement state of the subject device is a walking state and the charge state is a currently-charging state, the user may be walking in an indoor place.

Therefore, the estimation data 9F may set information indicating that estimation is not to be performed if the movement state of the subject device is a walking state and the charge state is a currently-charging state.

Figure 3:
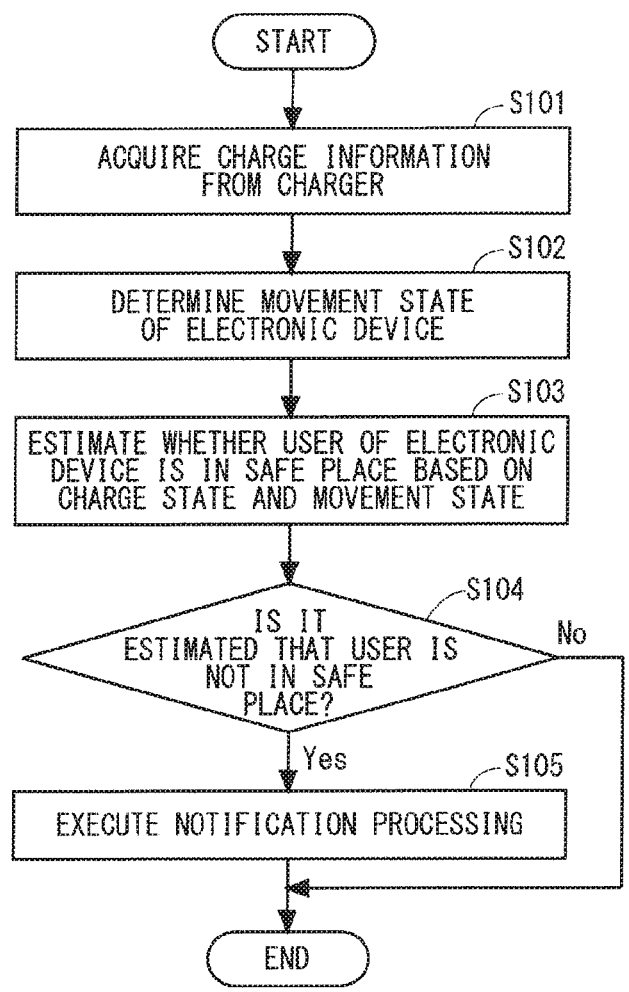
FIG. 3 illustrates a flowchart showing a processing procedure in one example of control performed by the electronic device.

FIG. 3 illustrates a flowchart showing a processing procedure in one example of control performed by the electronic device 1. The processing procedure illustrated in FIG. 3 is implemented by the controller 10 executing the control program 9A. The processing procedure illustrated in FIG. 3 is repeatedly executed by the controller 10. The processing procedure illustrated in FIG. 3 may be repeatedly executed in accordance with detection of the start of the charge of the battery 40, for example. The processing procedure illustrated in FIG. 3 may end the repeated execution after the elapse of a predetermined period of time since the charge of the battery 40 is finished, for example.

As illustrated in FIG. 3, as Step S101, the controller 10 of the electronic device 1 acquires charge information from the charger 41. The controller 10 may store the acquired charge information in the charge data 9E. As Step S102, the controller 10 determines a movement state of the subject device. For example, the controller 10 determines the current movement state of the subject device based on the acceleration data 9B indicating a detection result of the accelerometer 15 and the determination data 9D. The controller 10 stores the determination result in the storage 9, and then makes the processing proceed to Step S103.

As Step S103, the controller 10 determines whether the user of the subject device is in a safe place based on the charge state and the movement state. For example, the controller 10 estimates whether the user of the subject device is in a safe place based on the charge state indicated by the acquired charge information, the determined movement state, and the estimation data 9F. The controller 10 stores the estimation result in the storage 9, and then makes the processing proceed to Step S104.

As Step S104, the controller 10 determines whether it is estimated that the user is not in a safe place in Step S103. If the controller 10 determines that it is estimated that the user is not in a safe place (Yes in Step S104), the controller 10 makes the processing proceed to Step S105.

As Step S105, the controller 10 executes notification processing. For example, the notification processing includes processing of transmitting a radio wave containing notification information for giving notice of the presence of the user to an external electronic device located near the subject device via the communication unit 6. For example, the notification information may include information indicating the movement state of the subject device. Examples of the external electronic device include a roadside unit, a vehicle, and an on-board device mounted on a vehicle. If execution of the notification processing ends, the controller 10 ends the processing procedure illustrated in FIG. 3.

If the controller 10 determines that it is not estimated that the user is not in a safe place (No in Step S104), the controller 10 estimates that the user is in a safe place. Therefore, the controller 10 ends the processing procedure illustrated in FIG. 3 without executing notification processing.

One example illustrated in FIG. 3 describes a case where the processing procedure is a procedure of determining a movement state of the subject device after acquiring charge information, but this is not restrictive. For example, the processing procedure may be a procedure of acquiring charge information after determining a movement state of the subject device.

Figure 4:
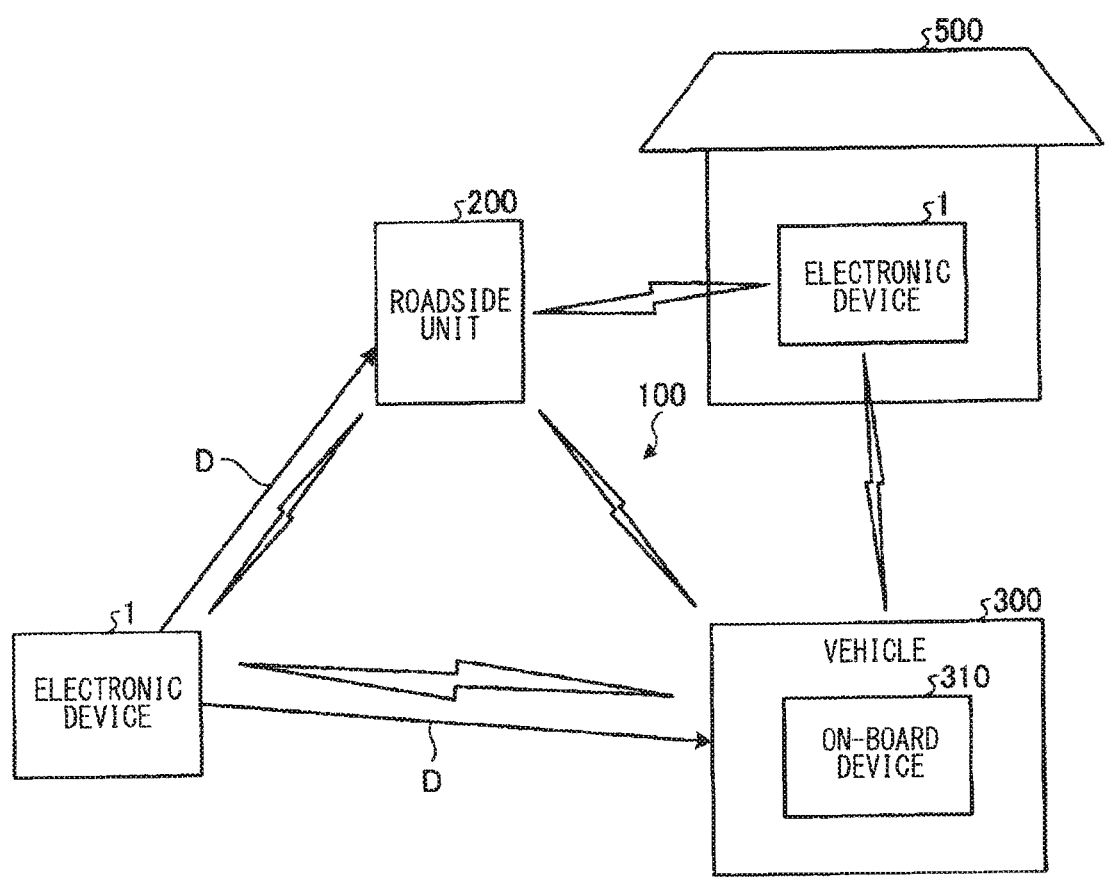
FIG. 4 illustrates a system diagram showing one example of a system configuration of a notification system.

FIG. 4 illustrates a system diagram showing one example of a system configuration of a notification system 100. With reference to FIG. 4, one example of the notification system 100 comprising the above-mentioned electronic device 1 is described.

As illustrated in FIG. 4, the notification system 100 comprises the above-mentioned electronic device 1, a roadside unit 200, and a vehicle 300. The roadside unit 200 is installed in a predetermined area, or near the predetermined area. Examples of the predetermined area include a road, an intersection, and a parking lot. The predetermined area may include a part that may cause a traffic accident, for example. The roadside unit 200 can send out a radio wave to a large number of unspecified electronic devices within and near the predetermined area. Examples of the vehicle 300 include an automobile, a truck, a bus, a taxi, and an emergency vehicle. The vehicle 300 comprises an on-board device 310. For example, the on-board device 310 is mounted on the vehicle 300 such that the on-board device 310 can receive a radio wave from the roadside unit 200. Examples of the on-board device 310 include on-board devices to be mounted on the vehicle 300, such as a navigation device, an on-board device for an electronic toll collection system (ETC), a combination meter, and a car audio. The on-board device 310 may be an electronic device brought inside the vehicle 300 by a driver, for example. Examples of the electronic device brought inside the vehicle 300 include a smartphone, a mobile phone, a wearable device, and a portable game machine.

The roadside unit 200 and the on-board device 310 each comprise a communication unit. The roadside unit 200 and the on-board device 310 are configured to be capable of performing two-way communication with each other via the communication units. The roadside unit 200 and the on-board device 310 are configured to be capable of performing two-way communication with the electronic device 1 that is in an indoor or outdoor place via the communication units. The roadside unit 200 includes a function of transmitting information about the predetermined area. The on-board device 310 includes a function of providing received information to the user.

For example, the user carrying the electronic device 1 is charging the battery 40 of the electronic device 1 in a stopping state inside a building 500 such as a home or an office. In this case, the electronic device 1 determines that the charge state of the battery 40 is a currently-charging state, and the movement state of the subject device is a stopping state. Since the charge state is a currently-charging state and the movement state of the subject device is a stopping state, the electronic device 1 estimates that the user is in a safe place based on the estimation data 9F. If the electronic device 1 estimates that the user is in a safe place, the electronic device 1 does not execute notification processing with respect to an external electronic device. As a result, the electronic device 1 does not activate the communication unit 6, and can thus reduce power consumption. At the same time, the on-board device 310 does not receive notification from the electronic device 1 carried by the user in a safe place, and thus the probability that a driver is provided with unnecessary information can be reduced.

After that, for example, the user finishes charging the battery 40 of the electronic device 1, and walks out of the building 500. In this case, the electronic device 1 determines that the charge state of the battery 40 is a post-charge state, and the movement state of the subject device is a walking state. Since the charge state is a post-charge state and the movement state of the subject device is a walking state, the electronic device 1 estimates that the user is not in a safe place based on the estimation data 9F. If it is estimated that the user is not in a safe place, notification processing with respect to an external electronic device is executed. For example, if the roadside unit 200 and the on-board device 310 capable of communication are present near the electronic device 1, the electronic device 1 transmits a radio wave containing notification information D for giving notice of the presence of the user to the roadside unit 200 and the on-board device 310. As a result, the electronic device 1 can notify the roadside unit 200, the on-board device 310, etc. about the presence of the user, and can thus enhance safety of the user. On the other hand, if the on-board device 310 receives notification information D from the electronic device 1 carried by the user not in a safe place, the on-board device 310 can notify a driver that a pedestrian who may dangerously run out is present nearby, for example. As a result, the driver can enhance the probability of avoiding a traffic accident involving a vulnerable road user, such as a pedestrian and a person riding a bicycle. If the roadside unit 200 receives notification information D from the electronic device 1 carried by the user not in a safe place, the roadside unit 200 can transfer the notification information D to the vehicle 300, the on-board device 310, or the like that approaches the roadside unit 200, for example. As a result, the roadside unit 200 can contribute to avoiding a traffic accident involving the vehicle 300 and a vulnerable road user.

For example, the user carrying the electronic device 1 is charging the battery 40 of the electronic device 1 in a moving state on a second conveyance (a bicycle) in an outdoor place. In this case, the electronic device 1 determines that the charge state of the battery 40 is a currently-charging state, and the movement state of the subject device is a moving state on a second conveyance. Since the charge state is a currently-charging state and the movement state of the subject device is a moving state on a second conveyance, the electronic device 1 estimates that the user is not in a safe place based on the estimation data 9F. If the electronic device 1 estimates that the user is not in a safe place, the electronic device 1 executes notification processing with respect to an external electronic device. For example, if the on-board device 310 capable of communication is present near the electronic device 1, the electronic device 1 transmits a radio wave containing notification information D for giving notice of the presence of the user to the on-board device 310. As a result, the electronic device 1 can notify the on-board device 310 about the presence of the user, and can thus enhance safety of the user. On the other hand, if the on-board device 310 receives notification information D from the electronic device 1 carried by the user not in a safe place, the on-board device 310 can notify a driver that a pedestrian who may dangerously run out is present nearby, for example. As a result, the driver can enhance the probability of avoiding a traffic accident involving a vulnerable road user such as a pedestrian.

One example above describes a case where the electronic device 1 estimates whether the user is in a safe place based on the charge state of the battery 40 and the movement state of the subject device, but this is not restrictive. For example, the electronic device 1 may estimate whether the user is in an indoor place based on the charge state of the battery 40 and the movement state of the subject device.

FIG. 5 illustrates a diagram showing another example of the estimation data 9F. With reference to FIG. 5, another example of a relationship between the charge state of the battery 40 and the movement state of the subject device indicated by the estimation data 9F is described.

For example, if the charge state of the electronic device 1 is a currently-charging state and the movement state is a stopping state or a motionless state, the user may be in an indoor place. For example, if the charge state of the electronic device 1 is a currently-charging state and the movement state is a moving state on a first conveyance, the user may be in a safe conveyance. For example, if the electronic device 1 can be charged by a mobile battery, the electronic device 1 may be charged even if the movement state is a walking state or a running state. On the other hand, there is a low probability that the user runs or rides a bicycle in an indoor place. Thus, if the charge state of the electronic device 1 is a currently-charging state and the movement state is a moving state on a second conveyance (e.g., a bicycle) or a running state, the user may be in an outdoor place. If the charge state of the electronic device 1 is a currently-charging state and the movement state is a walking state, the user may be in an outdoor place or an indoor place.

In one example illustrated in FIG. 5, the estimation data 9F indicates that it can be estimated that the user is in an indoor place if the charge state is a currently-charging state and a post-charge state and the movement state of the subject device is a stopping state or a motionless state. The estimation data 9F indicates that it can be estimated that the user is in a safe outdoor place if the charge state is a currently-charging state and the movement state of the subject device is a moving state on a first conveyance. The estimation data 9F indicates that it can be estimated that the user is in an outdoor place if the charge state is a currently-charging state and the movement state of the subject device is a moving state on a second conveyance or a running state. The estimation data 9F indicates that an indoor place and an outdoor place cannot be estimated if the charge state is a currently-charging state and a post-charge state and the movement state of the subject device is a walking state. The estimation data 9F indicates that an indoor place and an outdoor place cannot be estimated if the charge state is a post-charge state and the movement state of the subject device is a moving state on a first conveyance, a moving state on a second conveyance, or a running state.

The electronic device 1 can estimate whether the user of the subject device is in an indoor place based on the charge state of the battery 40 and the movement state of the subject device by referring to the estimation data 9F. The electronic device 1 can enhance accuracy of estimating an environment around the subject device by combining detection results of the charge state of the battery 40 and the movement state of the subject device. The electronic device 1 can improve a use method of the determined movement state of the subject device. The electronic device 1 can estimate an environment around the subject device even in a place where the current position of the subject device cannot be detected by regarding the start of the charge of the battery 40 etc. as a trigger.

Second Example

Figure 6:
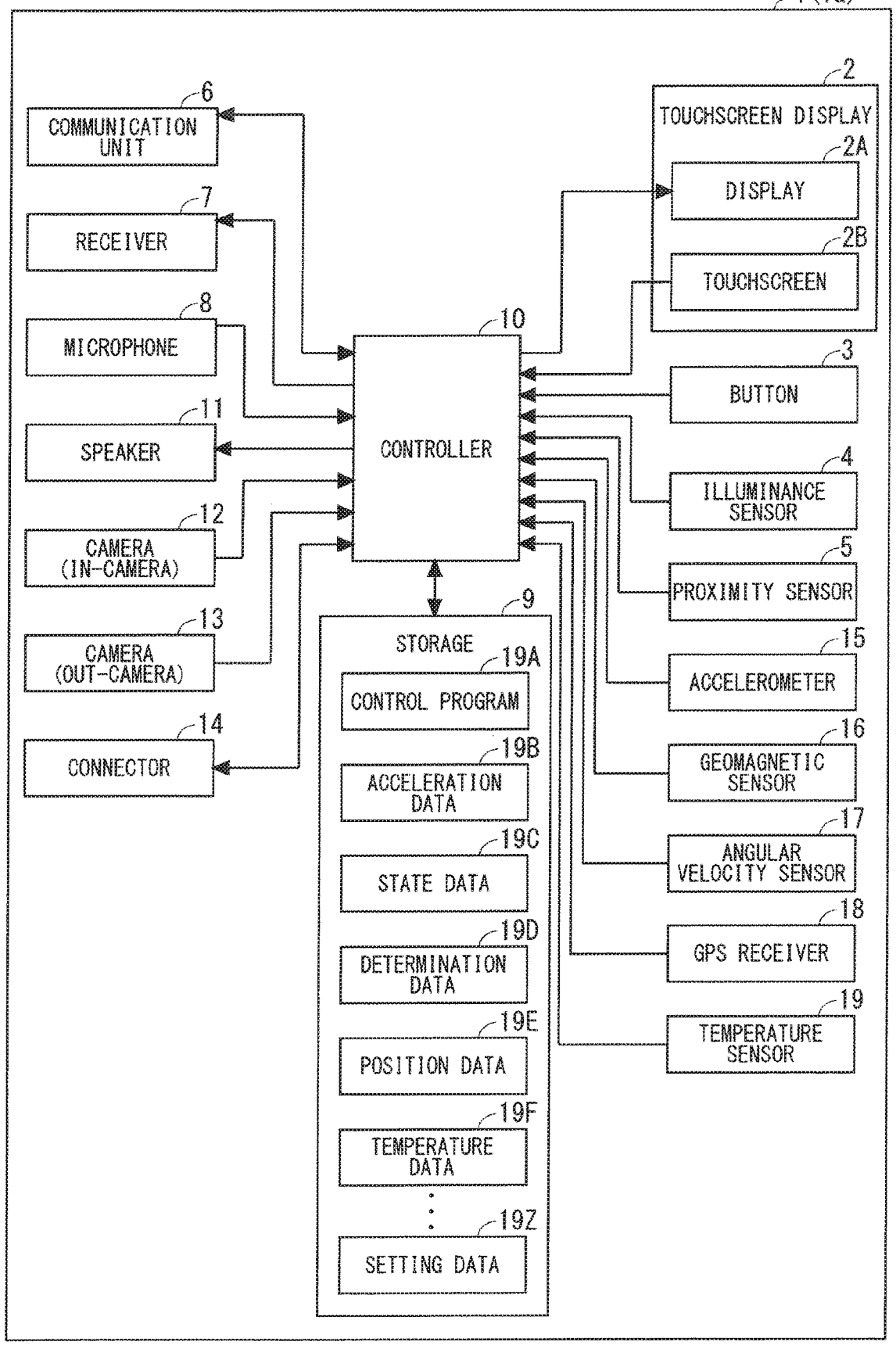
FIG. 6 illustrates a block diagram showing one example of a functional configuration of an electronic device.

With reference to FIG. 6, one example of a functional configuration of an electronic device 1 according to one example is described. FIG. 6 illustrates a block diagram showing one example of a functional configuration of the electronic device 1 according to one example. The electronic device 1 according to one example may be hereinafter referred to as an electronic device 1a.

As can be understood through comparison between FIG. 6 and FIG. 1 of the above, in terms of configuration, the electronic device 1a further comprises a temperature sensor 19 in comparison with the electronic device 1 according to the above-mentioned first example. Further, the electronic device 1a comprises a battery similar to the above-mentioned battery 40. In comparison with the electronic device 1 according to the first example, the electronic device 1a is different mainly in operation of the controller 10 and data stored in the storage 9. Note that the electronic device 1a may comprise a charger similar to the above-mentioned charger 41. The electronic device 1a may be hereinafter referred to as a "subject device."

The storage 9 according to one example can store, for example, a control program 19A, acceleration data 19B, state data 19C, determination data 19D, position data 19E, temperature data 19F, setting data 19Z, etc. The acceleration data 19B includes information about an acceleration value detected by the accelerometer 15. The state data 19C includes information indicating a movement state of the electronic device 1a. The determination data 19D includes information used to determine a movement state of the electronic device 1a. The position data 19E includes information about the position of the subject device detected by the GPS receiver 18. The temperature data 19F includes information about temperature detected by the temperature sensor 19. The setting data 19Z includes information about various settings relating to operation of the electronic device 1a.

The control program 19A can provide a function relating to various types of control to activate the electronic device 1a. For example, the control program 19A enables making a call by controlling the communication unit 6, the receiver 7, the microphone 8, etc. The function provided by the control program 19A includes a function of determining a plurality of movement states of the subject device achieved by controlling the accelerometer 15 etc.

Examples of the plurality of movement states of the electronic device 1a include a stopping state, a motionless state, a walking state, a running state, a moving state on a conveyance, and a moving state on a bicycle. The stopping state includes a state where the user carrying the subject device is stopping. The motionless state includes a state where the subject device is laid down. The walking state includes a state where the user carrying the subject device is walking. The running state includes a state where the user carrying the subject device is running. The moving state on a conveyance includes a state where the user carrying the subject device is moving on a conveyance. Examples of the conveyance include an automobile, a train, a bus, an airplane, and a motorcycle. The moving state on a bicycle includes a state where the user carrying the subject device is moving on a bicycle.

The control program 19A can provide a function of determining whether detection accuracy of the GPS receiver 18 has deteriorated. For example, the state where the detection accuracy of the GPS receiver 18 has deteriorated includes a case where intensity, sensitivity, or the like of signals received from a plurality of positioning satellites used in GPS has deteriorated. For example, if the user carrying the electronic device 1a moves from an outdoor place to an indoor place, the GPS receiver 18 may have difficulty in receiving signals from positioning satellites, or may not be able to receive signals from positioning satellites. Specifically, if detection accuracy of the GPS receiver 18 has deteriorated, the electronic device 1a can estimate that the user has entered an indoor place, an underground place, or the like. The control program 19A can provide a function of controlling communication of the communication unit 6 with another device based on the detection accuracy of the GPS receiver 18.

The control program 19A can provide a function of estimating that the user is in a safe place if the position of the electronic device 1a after deterioration of the detection accuracy of the GPS receiver 18 matches a preregistered position, such as the position of a home or an office of the user. For example, the user in an outdoor place may run out to a road or the like. Therefore, a driver driving an automobile needs to pay attention to a person who is not in a safe place as a dangerous object, but has less need to pay attention to a person who is in a safe place as a dangerous object.

The control program 19A can provide a function of transmitting information of a user related to the traffic to another device by means of the short-range wireless communication of the communication unit 6. For example, the information of a user related to the traffic includes information for giving notice that a user may run out to a road. For example, the information of a user related to the traffic includes information for notifying a driver of a vehicle about the presence of a user.

The acceleration data 19B is similar to the above-mentioned acceleration data 9B. A detection result of the accelerometer 15 is transmitted to the controller 10. The controller 10 can keep a log of the detection result of the accelerometer 15 in the acceleration data 19B in the storage 9. The controller 10 may calculate a synthesized vector value by computing an acceleration value in an X-axis direction, an acceleration value in a Y-axis direction, and an acceleration value in a Z-axis direction.

The state data 19C includes information indicating the current movement state of the subject device. Examples of the movement state of the subject device include a stopping state, a motionless state, a walking state, a running state, a moving state on a conveyance, and a moving state on a bicycle. The controller 10 can update the state data 19C in accordance with detection of change in the movement state of the subject device.

The determination data 19D includes acceleration patterns that individually correspond to a respective plurality of movement states of the subject device. Each of the acceleration patterns included in the determination data 19D exhibits a characteristic pattern of acceleration detected by the accelerometer 15 when the subject device is in a state that corresponds to the acceleration pattern. The acceleration pattern may be a pattern of acceleration that is actually detected by the accelerometer 15, or may be a predicted pattern of acceleration that will be detected by the accelerometer 15. The acceleration pattern is stored so as to correspond to the above-mentioned data containing the log of the synthesized vector value. The determination data 19D includes acceleration patterns that correspond to respective states of the stopping state, the motionless state, the walking state, the running state, the moving state on a conveyance, and the moving state on a bicycle, for example.

For example, the controller 10 can compare a pattern of the synthesized vector of the acceleration data 19B and an acceleration pattern of the determination data 19D. Then, the controller 10 can determine that a state associated with an acceleration pattern that matches the pattern of the synthesized vector of the acceleration data 19B is the current movement state of the electronic device 1. Note that the matching of patterns includes complete matching and matching at a predetermined ratio.

The position data 19E can store position information in time series. For example, the position information includes a value indicating a position, and a detection time. The position indicates latitude and longitude detected by the GPS receiver 18, for example. The time indicates time at which the GPS receiver 18 detects the position, for example. The position data 19E may include information indicating intensity, sensitivity, or the like of signals received at the GPS receiver 18, for example. For example, the position data 19E may include information indicating that detection accuracy of the GPS receiver 18 has deteriorated. The position data 19E is updated every time the GPS receiver 18 detects a position.

The temperature data 19F can store temperature information in time series. For example, the temperature information includes time, a value of temperature, and a change amount of temperature. The time indicates time at which the temperature sensor 19 detects temperature. The value of temperature indicates a value of the temperature detected by the temperature sensor 19. The change amount of temperature indicates a change amount of the temperature detected by the temperature sensor 19 in unit time. The temperature data 19F is updated every time the temperature sensor 19 detects temperature.

The setting data 19Z includes various pieces of data used for processing executed based on the functions provided by the control program 19A etc. The setting data 19Z includes information indicating whether the position detecting function of the GPS receiver 18 is valid. For example, if the position detecting function is valid, the electronic device 1a can detect the position of the subject device using the GPS receiver 18. For example, if the position detecting function is invalid, the electronic device 1a does not detect the position of the subject device using the GPS receiver 18. For example, if the position detecting function is invalid, the electronic device 1a does not activate the GPS receiver 18.

For example, a user tends to move within a certain activity area if the user is at home. In this case, continuous walking of the user is limited to a certain number of steps or less. The setting data 19Z includes a certain number of steps corresponding to the user as a first threshold for estimating movement to an outdoor place. It can be said that there is a high probability that the user has moved to an outdoor place if the number of steps taken in continuous walking of the user reaches the first threshold or more.

For example, the temperature sensor 19 may be able to detect temperature change between an indoor place and an outdoor place if there is temperature difference between an indoor place and an outdoor place. The electronic device 1a can estimate that the user has moved from an indoor place to an outdoor place by detecting predetermined temperature change. The setting data 19Z includes a predetermined change amount of temperature as a second threshold for estimating movement of the user from an indoor place to an outdoor place.

The controller 10 can execute a command that is contained in the program stored in the storage 9. The controller 10 can refer to the data stored in the storage 9 as necessary. The controller 10 controls a function unit in accordance with the data and the command. The controller 10 can implement various functions by controlling the function unit. For example, the function unit comprises, but not limited to, the display 2A, the communication unit 6, the receiver 7, and the speaker 11. The controller 10 may change control in accordance with a detection result of a detection unit. For example, the detection unit comprises, but not limited to, the touch screen 2B, the button 3, the illuminance sensor 4, the proximity sensor 5, the microphone 8, the camera 12, the camera 13, the accelerometer 15, the geomagnetic sensor 16, the angular velocity sensor 17, the GPS receiver 18, and the temperature sensor 19.

For example, the controller 10 can execute various types of control, such as changing information displayed on the display the display 2A in accordance with the gesture distinguished via the touch screen 2B, by executing the control program 19A.

The controller 10 can cooperate with the accelerometer 15, the geomagnetic sensor 16, the angular velocity sensor 17, the GPS receiver 18, and the temperature sensor 19 by executing the control program 19A. The controller 10 can execute processing of determining a movement state the subject device based on a detection result of the accelerometer 15.

Similarly to the above, the controller 10 can distinguish types of gestures based on a detection result detected by the touch screen 2B. The controller 10 may detect change in the movement state of the subject device based on a direction and magnitude of acceleration detected by the accelerometer 15, or an acceleration pattern including time-series change in a direction and magnitude of acceleration. The controller 10 can detect a moving direction of the user based on a geomagnetic value detected by the geomagnetic sensor 16. The controller 10 can detect change in the direction of the electronic device 1 based on the magnitude and direction of the angular velocity detected by the angular velocity sensor 17, or an angular velocity pattern including time-series change in the direction and magnitude of the angular velocity. For example, the controller 10 can change the azimuth of the electronic device 1 based on the change in the direction of the electronic device 1 in an environment where the geomagnetism cannot be detected etc.

The GPS receiver 18 according to one example can specify positioning sensitivity, tracking sensitivity, etc. of signals received from GPS satellites. For example, the positioning sensitivity includes a minimum power level at which the GPS receiver 18 can perform positioning. For example, the tracking sensitivity includes a minimum power level at which individual satellites can be tracked. The GPS receiver 18 can send out information indicating the specified positioning sensitivity, tracking sensitivity, etc. of the signals to the controller 10. For example, the GPS receiver 18 may send out information such as position accuracy, a position deviation, a noise figure, and positioning time to the controller 10.

The temperature sensor 19 can detect temperature around the electronic device 1a. For example, the temperature sensor 19 comprises a thermistor or the like. For example, a detection result of the temperature sensor 19 is used to detect whether the user has moved out of an indoor place to an outdoor place, and whether the user has moved into an indoor place from an outdoor place.

The controller 10 may use outputs of the accelerometer 15, the geomagnetic sensor 16, and the angular velocity sensor 17 in combination. If outputs of a plurality of sensors are used in combination, the electronic device 1a can execute control reflecting the motion of the subject device at a high level by using the controller 10. If the accelerometer 15, the geomagnetic sensor 16, and the angular velocity sensor 17 are used in combination, the electronic device 1a can detect the number of steps and a direction of the walking of the user. The accelerometer 15, the geomagnetic sensor 16, and the angular velocity sensor 17 may be used as a single motion sensor. For example, if a determined movement state is changed from one of a stopping state and a motionless state to one of a walking state and a running state, the electronic device 1a may assume that the user has started continuous walking, and may start counting the number of steps of the user. Then, if a determined movement state is changed from one of a walking state and a running state to one of a stopping state and a motionless, the electronic device 1a may assume that the user has finished continuous walking, and may end counting the number of steps. The electronic device 1a may store the number of steps that is counted from when the count of the number of steps is started until the count of the number of steps is ended in the storage 9 as the number of steps of the user taken in continuous walking. For example, the electronic device 1a may measure a period of time in which the number of steps is not counted after starting the count of the number of steps. Then, if a period of time in which the number of steps is not counted is a predetermined period of time or more, the electronic device 1a may store the number of steps counted until it is determined that a period of time is the predetermined period of time or more in the storage 9 as the number of steps of the user taken in continuous walking. The electronic device 1a may determine that the user is in an outdoor place if the number of steps stored in the storage 9 as the number of steps of the user taken in continuous walking is equal to or more than the first threshold. In other words, the electronic device 1a may determine that the user is in an indoor place if the number of steps stored in the storage 9 as the number of steps of the user taken in continuous walking is less than the first threshold.

Some or all of the programs and the pieces of the data stored in the storage 9 in FIG. 6 may be downloaded from another device by means of wireless communication of the communication unit 6. Some or all of the programs and the pieces of the data stored in the storage 9 in FIG. 6 may be stored in a non-transitory storage medium that can be read by a reader comprised in the storage 9. Some or all of the programs and the pieces of the data stored in the storage 9 in FIG. 6 may be stored in a non-transitory storage medium that can be read by a device to be connected to the connector 14. Examples of the non-transitory storage medium include, but not limited to, an optical disc such as a CD (trademark), a DVD (trademark), and a Blu-ray (trademark), a magneto-optical disk, a magnetic storage medium, a memory card, and a solid-state storage medium.

Figure 7:
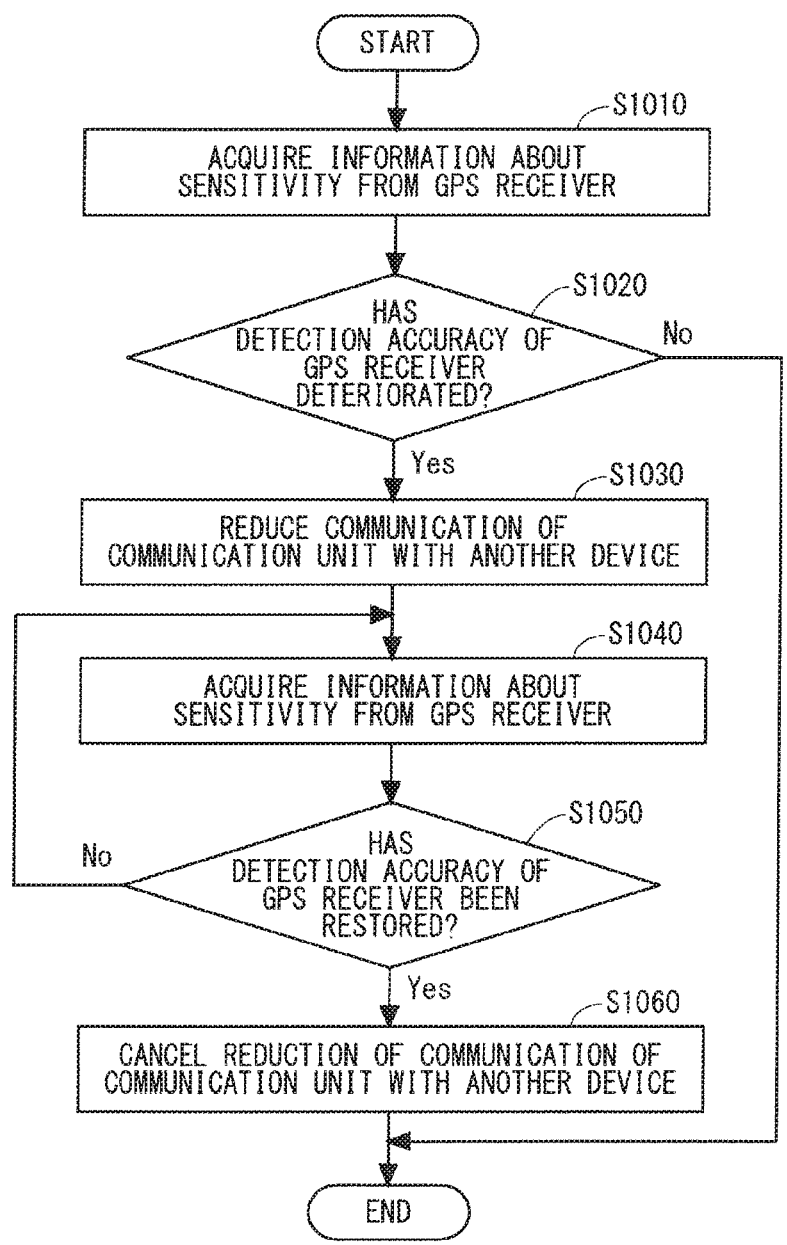
FIG. 7 illustrates a flowchart showing a processing procedure in one example of control performed by the electronic device.

FIG. 7 illustrates a flowchart showing a processing procedure in one example of control performed by the electronic device 1a. The processing procedure illustrated in FIG. 7 is implemented by the controller 10 executing the control program 19A. The processing procedure illustrated in FIG. 7 is repeatedly executed by the controller 10 if information indicating that the position detecting function of the GPS receiver 18 is valid is set in the setting data 19Z. The processing procedure illustrated in FIG. 7 is not executed by the controller 10 if information indicating that the position detecting function of the GPS receiver 18 is invalid is set in the setting data 19Z.

As illustrated in FIG. 7, as Step S1010, the controller 10 of the electronic device 1a acquires information about sensitivity from the GPS receiver 18. For example, the information about sensitivity includes information indicating positioning sensitivity, tracking sensitivity, etc. about signals received from positioning satellites.

As Step S1020, the controller 10 determines whether detection accuracy of the GPS receiver 18 has deteriorated based on the information acquired in Step S1010. For example, the controller 10 determines that the detection accuracy of the GPS receiver 18 has deteriorated if the sensitivity of the GPS receiver 18 deteriorates to be less than a predetermined value. For example, the controller 10 determines that the detection accuracy of the GPS receiver 18 has deteriorated if the GPS receiver 18 is unable to measure a position. If the controller 10 determines that the detection accuracy of the GPS receiver 18 has not deteriorated (No in Step S1020), the controller 10 ends the processing procedure illustrated in FIG. 7. If the controller 10 determines that the detection accuracy of the GPS receiver 18 has deteriorated (Yes in Step S1020), the controller 10 makes the processing proceed to Step S1030.

As Step S1030, the controller 10 reduces communication of the communication unit 6 with another device. Examples of another device include a communication device mounted on a vehicle and a roadside unit. For example, there is a high probability that the user is in a safe place such as an indoor place and an underground place if the detection accuracy of the GPS receiver 18 deteriorates. For example, if the controller 10 reduces short-range wireless communication with another device, the controller 10 can allow the communication unit 6 to receive a signal from another device without allowing the communication unit 6 to transmit various pieces of information to another device. The controller 10 starts to reduce communication with another device, and then makes the processing proceed to Step S1040.

As Step S1040, the controller 10 acquires information about sensitivity from the GPS receiver 18, and then makes the processing proceed to Step S1050.

As Step S1050, the controller 10 determines whether the detection accuracy of the GPS receiver 18 has been restored based on the information acquired in Step S1040. For example, the controller 10 determines that the detection accuracy of the GPS receiver 18 has been restored if the sensitivity of the GPS receiver 18 does not deteriorate to be less than a predetermined value. For example, the controller 10 determines that the detection accuracy of the GPS receiver 18 has been restored if the GPS receiver 18 becomes able to measure a position. If the controller 10 determines that the detection accuracy of the GPS receiver 18 has not been restored (No in Step S1050), the controller 10 returns the processing to Step S1040 described above. If the controller 10 determines that the detection accuracy of the GPS receiver 18 has been restored (Yes in Step S1050), the controller 10 makes the processing proceed to Step S1060.

As Step S1060, the controller 10 cancels the reduction of communication of the communication unit 6 with another device. For example, there is a high probability that the user has moved from a safe place to an outdoor place if detection accuracy of the GPS receiver 18 that has deteriorated is restored. For example, the controller 10 can enable the communication unit 6 to transmit and receive information with another device by canceling the reduction of communication. If the controller 10 cancels the reduction of communication with another device, the controller 10 ends the processing procedure illustrated in FIG. 7.

The electronic device 1a can estimate that the user is in a safe place where there is a low probability of being involved in a traffic accident, such as an indoor place and an underground place, if the detection accuracy of the GPS receiver 18 deteriorates. The electronic device 1a can reduce communication of the communication unit 6 with another device if the detection accuracy of the GPS receiver 18 deteriorates. As a result, the electronic device 1a can provide a highly convenient method of communicating with another device depending on a condition of the detection accuracy of the GPS receiver 18. The electronic device 1a can reduce power consumption of the communication unit 6 during a period of time in which the detection accuracy of the GPS receiver 18 deteriorates, and thus the electronic device 1a can prolong the durability of the battery of the subject device. For example, if the electronic device 1a notifies another device located near the subject device about the presence of the user, the electronic device 1a can reduce the notification when the detection accuracy of the GPS receiver 18 deteriorates. As a result, if the position detecting function of the GPS receiver 18 is valid, the electronic device 1a can reduce communication traffic because unnecessary communication with another device is reduced.

The electronic device 1a can estimate that the user has left a safe place if the detection accuracy of the GPS receiver 18 is restored. The electronic device 1a can automatically cancel the reduction of communication of the communication unit 6 with another device if the detection accuracy of the GPS receiver 18 is restored. As a result, the electronic device 1a can control reduction of communication of the communication unit 6 with another device depending on whether the user is in a safe place.

Other operation examples of the electronic device 1a are described below. The electronic device 1a described below has a similar configuration to the configuration of the electronic device 1a illustrated in FIG. 6 except for the difference of the function of the control program 19A.

Figure 8:
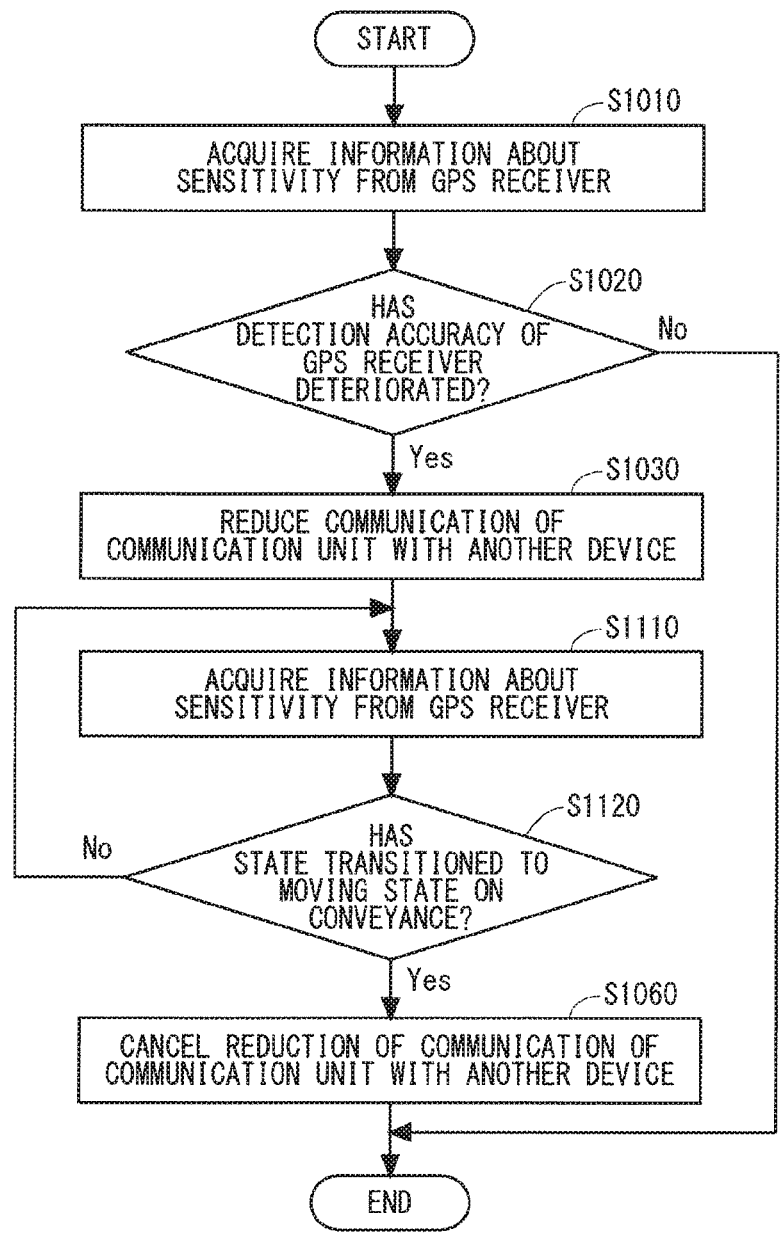
FIG. 8 illustrates a flowchart showing a processing procedure in one example of control performed by the electronic device.

FIG. 8 illustrates a flowchart showing a processing procedure in another example of control performed by the electronic device 1a. The processing procedure illustrated in FIG. 8 is implemented by the controller 10 executing the control program 19A. The processing procedure illustrated in FIG. 8 is repeatedly executed by the controller 10 if information indicating that the position detecting function of the GPS receiver 18 is valid is set in the setting data 19Z. The processing procedure illustrated in FIG. 8 is not executed by the controller 10 if information indicating that the position detecting function of the GPS receiver 18 is invalid is set in the setting data 19Z.

In one example illustrated in FIG. 8, the processing from Step S1010 to Step S1030 and Step S1060 is the same as the processing from Step S1010 to Step S1030 and Step S1060 illustrated in FIG. 7. Only a part of the processing procedure illustrated in FIG. 8 that is different from the processing procedure illustrated in FIG. 7 is described below, and description of the same part is omitted.

As illustrated in FIG. 8, the controller 10 reduces communication of the communication unit 6 with another device in Step S1030, and then makes the processing proceed to Step S1110. As Step S1110, the controller 10 determines a movement state of the subject device based on the acceleration data 19B. For example, the controller 10 compares an acceleration pattern of the acceleration data 19B and an acceleration pattern of each movement state of the determination data 19D. Then, the controller 10 determines that a state that corresponds to the acceleration pattern of the determination data 19D that matches the acceleration pattern of the acceleration data 19B is the current state of the subject device. The controller 10 stores the determined state in the state data 19C.

After Step S1110, as Step S1120, the controller 10 determines whether the state of the subject device has transitioned to a moving state on a conveyance. For example, the controller 10 determines that the state has transitioned to a moving state on a conveyance if the controller 10 determines that the state is a moving state on a conveyance in Step S1110 and a state before the determination is another state such as a motionless state and a stopping state. If the controller 10 determines that the state has not transitioned to a moving state on a conveyance (No in Step S1120), the controller 10 returns the processing to Step S1110 described above. If the controller 10 determines that the state has transitioned to a moving state on a conveyance (Yes in Step S1120), the controller 10 makes the processing proceed to Step S1060 described above. If the controller 10 ends the processing of Step S1060, the controller 10 ends the processing procedure illustrated in FIG. 8.

One example illustrated in FIG. 8 describes a case where the electronic device 1a uses transition to a moving state on a conveyance as a condition for canceling reduction of communication, but this is not restrictive. For example, similarly to one example illustrated in FIG. 7, the electronic device 1a may add restoration of the detection accuracy of the GPS receiver 18 into the condition for canceling reduction of communication.

If the state of the subject device transitions to a moving state on a conveyance after deterioration of the detection accuracy of the GPS receiver 18, the electronic device 1a can cancel the reduction of communication of the communication unit 6 with another device. The electronic device 1a can estimate that the user has moved from a safe place depending on a condition of the detection accuracy of the GPS receiver 18. For example, the user is not a vulnerable road user if the conveyance is an automobile, a train, or the like. In such a case, the electronic device 1a may continue reducing communication of the communication unit 6 with another device.

Figure 9:
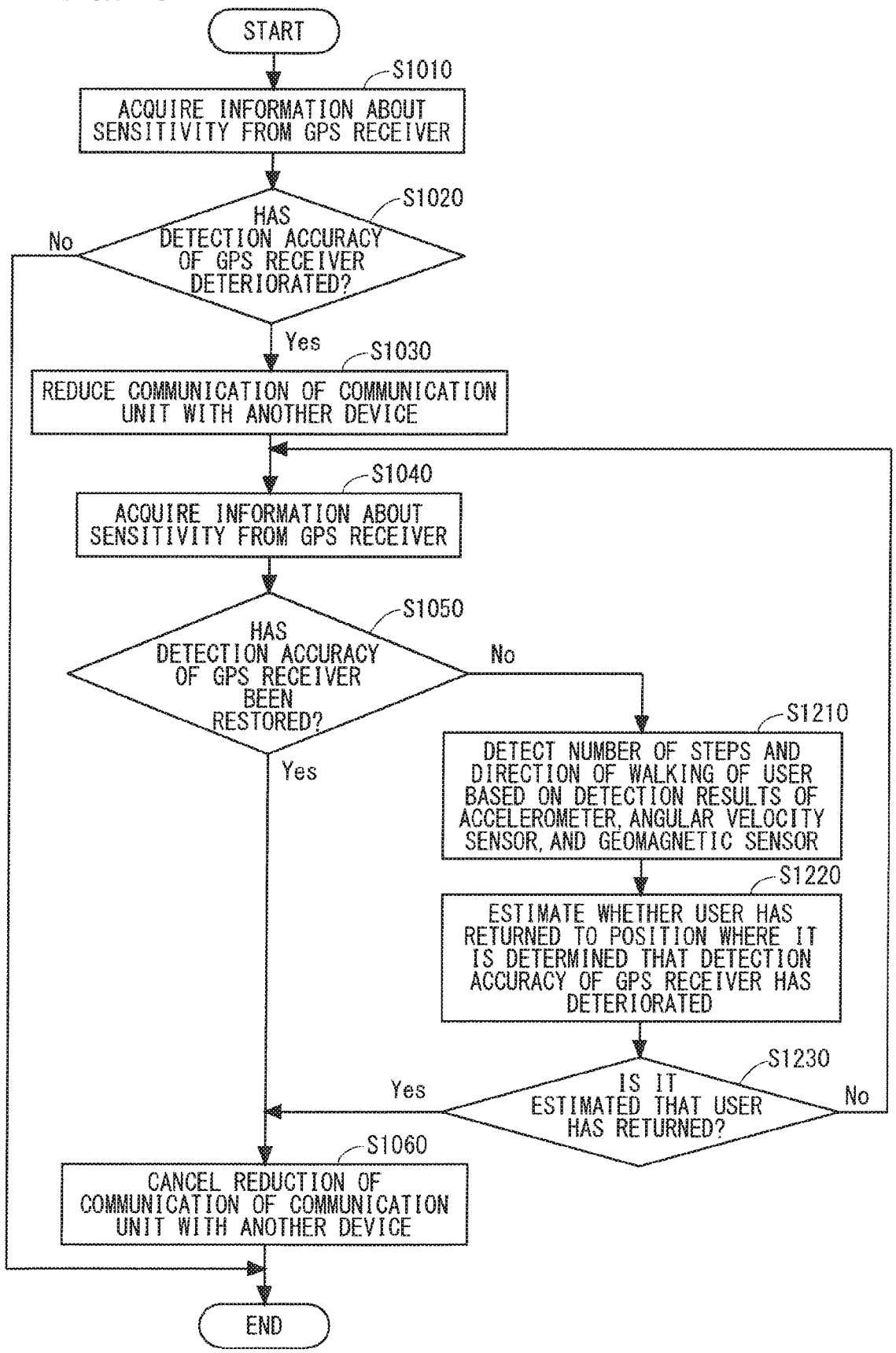
FIG. 9 illustrates a flowchart showing a processing procedure in one example of control performed by the electronic device.

FIG. 9 illustrates a flowchart showing a processing procedure in another example of control performed by the electronic device 1a. The processing procedure illustrated in FIG. 9 is implemented by the controller 10 executing the control program 19A. The processing procedure illustrated in FIG. 9 is repeatedly executed by the controller 10 if information indicating that the position detecting function of the GPS receiver 18 is valid is set in the setting data 19Z. The processing procedure illustrated in FIG. 9 is not executed by the controller 10 if information indicating that the position detecting function of the GPS receiver 18 is invalid is set in the setting data 19Z.

In one example illustrated in FIG. 9, the processing from Step S1010 to Step S1060 is the same as the processing from Step S1010 to Step S1060 illustrated in FIG. 7. Only a part of the processing procedure illustrated in FIG. 9 that is different from the processing procedure illustrated in FIG. 7 is described below, and description of the same part is omitted.

As illustrated in FIG. 9, if the controller 10 determines that the detection accuracy of the GPS receiver 18 has not been restored (No in Step S1050), the controller 10 makes the processing proceed to Step S1210. As Step S1210, the controller 10 detects the number of steps and a direction of the walking of the user based on detection results of the accelerometer 15, the angular velocity sensor 17, and the geomagnetic sensor 16. For example, the controller 10 detects the number of steps of the user carrying the subject device based on the detected acceleration by executing a step counting program. For example, the controller 10 detects a walking direction of the user based on the detected angular velocity, geomagnetism, etc. by executing the step counting program. The controller 10 stores the detected number of steps and direction in the storage 9, and then makes the processing proceed to Step S1220.

As Step S1220, the controller 10 estimates whether the user has returned to the position where it is determined that the detection accuracy of the GPS receiver 18 has deteriorated. The controller 10 may estimate a walking route of the user based on the detected number of steps and direction. When estimating a walking route of the user, the controller 10 can estimate a relative positional relationship between the position where estimation of a walking route is started and the current position in the walking route. For example, the controller 10 estimates a moving route of the user based on the number of steps and direction of the user detected in Step S1210 after it is determined in Step S1020 that the detection accuracy of the GPS receiver 18 has deteriorated. Then, the controller 10 estimates whether the user has returned to the position where it is determined that the detection accuracy of the GPS receiver 18 has deteriorated based on the estimated moving route. For example, the user may leave a safe place if the user returns to a position where the user entered a safe place. In this case, the detection accuracy of the GPS receiver 18 may be restored. The controller 10 can estimate restoration of the detection accuracy of the GPS receiver 18 by estimating that the user has returned to a position where the user entered a safe place. The controller 10 stores the estimation result in the storage 9, and then makes the processing proceed to Step S1230.

As Step S1230, the controller 10 determines whether it is estimated that the user has returned based on the estimation result of Step S1220. If the controller 10 determines that it is not estimated that the user has returned (No in Step S1230), the controller 10 returns the processing to Step S1040 described above. If the controller 10 determines that it is estimated that the user has returned (Yes in Step S1230), the controller 10 makes the processing proceed to Step S1060 described above. If the controller 10 ends the processing of Step S1060, the controller 10 ends the processing procedure illustrated in FIG. 9.

One example illustrated in FIG. 9 describes a case where the electronic device 1*a* uses restoration of detection accuracy of the GPS receiver 18 as a condition for canceling reduction of communication, but this is not restrictive. For example, the electronic device 1*a* may not use restoration of detection accuracy of the GPS receiver 18 as the condition for canceling reduction of communication. In this case, for example, Step S1210 is executed subsequently to Step S1040 without execution of Step S1050.

If the detection accuracy of the GPS receiver 18 is not restored after deterioration of the detection accuracy of the GPS receiver 18, the electronic device 1*a* can cancel the reduction of communication of the communication unit 6 with another device when the user returns to the position where it is determined that the detection accuracy of the GPS receiver 18 has deteriorated. As a result, the electronic device 1*a* can reduce communication of the communication unit 6 with another device during a period of time from when the user enters a safe place until the user returns to the location. Thus, the electronic device 1*a* can provide a highly convenient method of communicating with another device.

Figure 10:
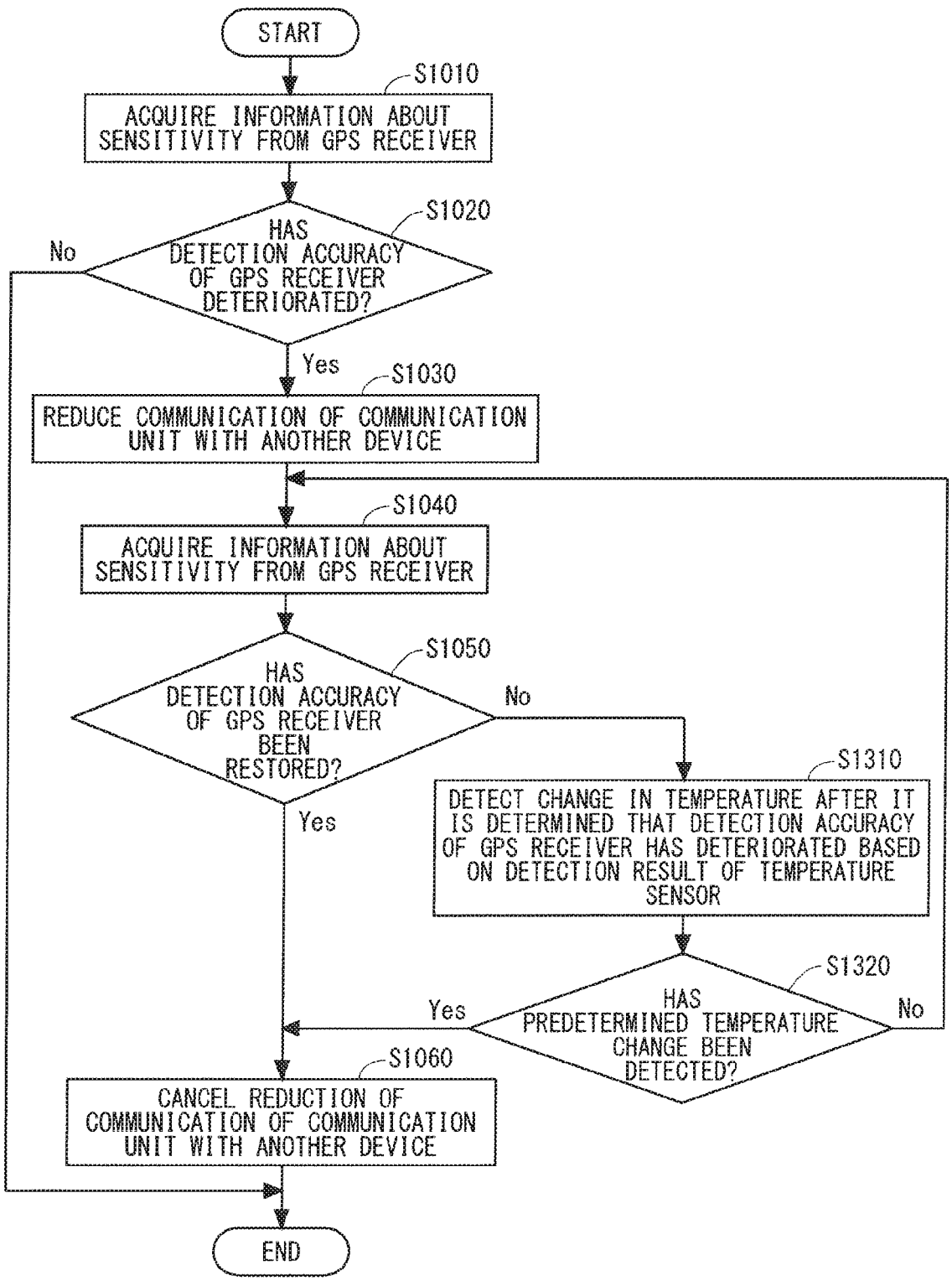
FIG. 10 illustrates a flowchart showing a processing procedure in one example of control performed by the electronic device.

FIG. 10 illustrates a flowchart showing a processing procedure in another example of control performed by the electronic device 1*a*. The processing procedure illustrated in FIG. 10 is implemented by the controller 10 executing the control program 19A. The processing procedure illustrated in FIG. 10 is repeatedly executed by the controller 10 if information indicating that the position detecting function of the GPS receiver 18 is valid is set in the setting data 19Z. The processing procedure illustrated in FIG. 10 is not executed by the controller 10 if information indicating that the position detecting function of the GPS receiver 18 is invalid is set in the setting data 19Z.

In one example illustrated in FIG. 10, the processing from Step S1010 to Step S1060 is the same as the processing from Step S1010 to Step S1060 illustrated in FIG. 7. Only a part of the processing procedure illustrated in FIG. 10 that is different from the processing procedure illustrated in FIG. 7 is described below, and description of the same part is omitted.

As illustrated in FIG. 10, if the controller 10 of the electronic device 1 determines that the detection accuracy of the GPS receiver 18 has not been restored (No in Step S1050), the controller 10 of the electronic device 1 makes the processing proceed to Step S1310. As Step S1310, the controller 10 detects change in temperature after it is determined in Step S1020 that the detection accuracy of the GPS receiver 18 has deteriorated based on a detection result of the temperature sensor 19. For example, the controller 10 detects change in temperature during a predetermined period of time from the temperature data 19F. For example, the predetermined period of time includes a period of time from the present time point to time that is a certain period of time before the present time point.

As Step S1320, the controller 10 determines whether predetermined temperature change has been detected. For example, the controller 10 determines that predetermined temperature change has been detected if detected temperature change is more than the second threshold of the setting data 19Z. If the controller 10 determines that predetermined temperature change has not been detected (No in Step S1320), the controller 10 returns the processing to Step S1040 described above. If the controller 10 determines that predetermined temperature change has been detected (Yes in Step S1320), the controller 10 makes the processing proceed to Step S1060 described above. If the controller 10 ends the processing of Step S1060, the controller 10 ends the processing procedure illustrated in FIG. 10.

One example illustrated in FIG. 10 describes a case where the electronic device 1 uses restoration of detection accuracy of the GPS receiver 18 as a condition for canceling reduction of communication, but this is not restrictive. For example, the electronic device 1 may not use restoration of detection accuracy of the GPS receiver 18 as the condition for canceling reduction of communication. In this case, for example, Step S1310 is executed subsequently to Step S1040 without execution of Step S1050.

If the detection accuracy of the GPS receiver 18 is not restored after deterioration of the detection accuracy of the GPS receiver 18, the electronic device 1*a* can cancel the reduction of communication of the communication unit 6 with another device when predetermined temperature change is detected. As a result, the electronic device 1*a* can reduce communication of the communication unit 6 with another device during a period of time in which the user stays in a safe place. Thus, the electronic device 1*a* can provide a highly convenient method of communicating with another device.

Figure 11:
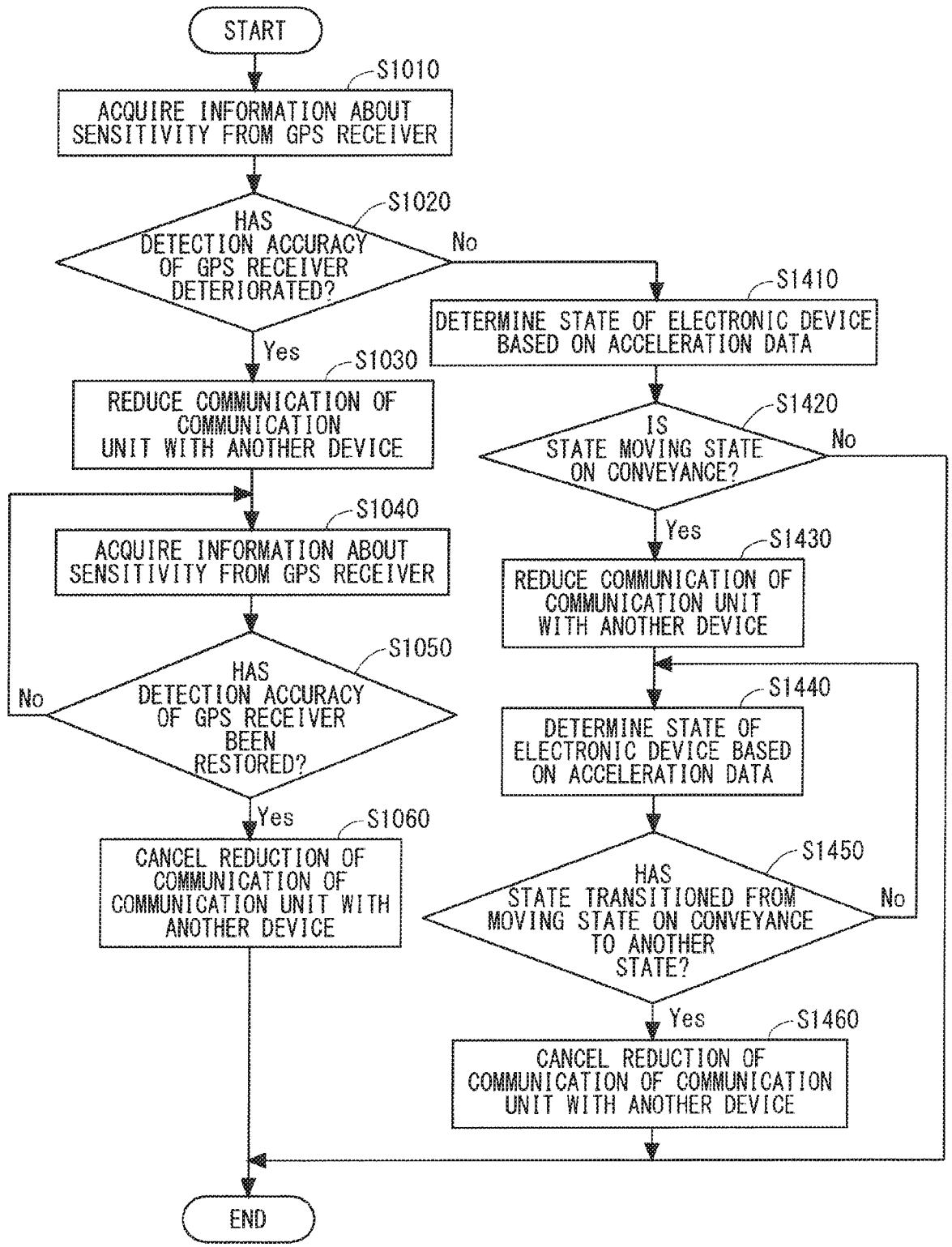
FIG. 11 illustrates a flowchart showing a processing procedure in one example of control performed by the electronic device.

FIG. 11 illustrates a flowchart showing a processing procedure in another example of control performed by the electronic device 1*a*. The processing procedure illustrated in FIG. 11 is implemented by the controller 10 executing the control program 19A. The processing procedure illustrated in FIG. 11 is repeatedly executed by the controller 10 if information indicating that the position detecting function of the GPS receiver 18 is valid is set in the setting data 19Z. The processing procedure illustrated in FIG. 11 is not executed by the controller 10 if information indicating that the position detecting function of the GPS receiver 18 is invalid is set in the setting data 19Z.

In one example illustrated in FIG. 11, the processing from Step S1010 to Step S1060 is the same as the processing from Step S1010 to Step S1060 illustrated in FIG. 7. Only a part of the processing procedure illustrated in FIG. 11 that is different from the processing procedure illustrated in FIG. 7 is described below, and description of the same part is omitted.

As illustrated in FIG. 11, if the controller 10 of the electronic device 1 determines that the detection accuracy of the GPS receiver 18 has not deteriorated (No in Step S1020), the controller 10 of the electronic device 1 makes the processing proceed to Step S1410. As Step S1410, the controller 10 determines a state of the subject device based on the acceleration data 19B, and then makes the processing proceed to Step S1420.

As Step S1420, the controller 10 determines whether the state of the subject device is a moving state on a conveyance based on the determination result of Step S1410. If the controller 10 determines that the state is not a moving state on a conveyance (No in Step S1420), the controller 10 ends the processing procedure illustrated in FIG. 11. If the controller 10 determines that the state is a moving state on a conveyance (Yes in Step S1420), the controller 10 makes the processing proceed to Step S1430.

Similarly to Step S1030, as Step S1430, the controller 10 reduces communication of the communication unit 6 with another device, and then makes the processing proceed to Step S1440. As Step S1440, the controller 10 determines a state of the subject device based on the acceleration data 19B, and then makes the processing proceed to Step S1450.

As Step S1450, the controller 10 determines whether the state of the subject device has transitioned from a moving state on a conveyance to another state based on the determination result of Step S1440. If the controller 10 determines that the state has not transitioned from a moving state on a conveyance to another state (No in Step S1450), the controller 10 returns the processing to Step S1440 described above. If the controller 10 determines that the state has transitioned from a moving state on a conveyance to another state (Yes in Step S1450), the controller 10 makes the processing proceed to Step S1460.

Similarly to Step S1060, as Step S1460, the controller 10 cancels the reduction of communication of the communication unit 6 with another device. If the controller 10 cancels the reduction of communication, the controller 10 ends the processing procedure illustrated in FIG. 11.

The electronic device 1 can reduce communication of the communication unit 6 with another device if the detection accuracy of the GPS receiver 18 does not deteriorate and the state is a moving state on a conveyance such as a vehicle and a train. As a result, the electronic device 1 can reduce communication of the communication unit 6 with another device during a period of time in which the user is moving on a conveyance such as a vehicle and a train. Thus, the electronic device 1 can provide a highly convenient method of communicating with another device.

Figure 12:
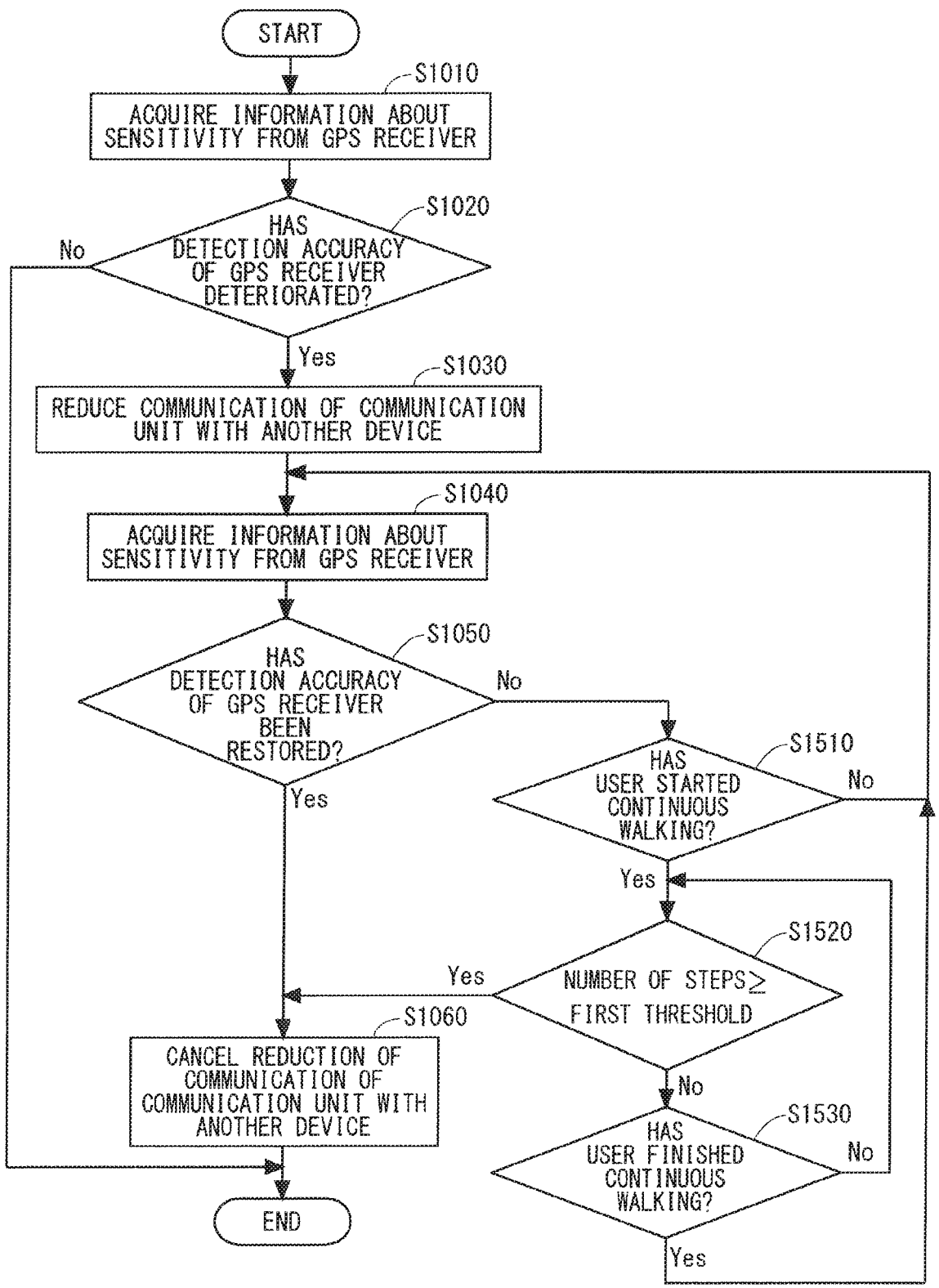
FIG. 12 illustrates a flowchart showing a processing procedure in one example of control performed by the electronic device.

FIG. 12 illustrates a flowchart showing a processing procedure in another example of control performed by the electronic device 1a. The processing procedure illustrated in FIG. 12 is implemented by the controller 10 executing the control program 19A. The processing procedure illustrated in FIG. 12 is repeatedly executed by the controller 10 if information indicating that the position detecting function of the GPS receiver 18 is valid is set in the setting data 19Z. The processing procedure illustrated in FIG. 12 is not executed by the controller 10 if information indicating that the position detecting function of the GPS receiver 18 is invalid is set in the setting data 19Z.

In one example illustrated in FIG. 12, the processing from Step S1010 to Step S1060 is the same as the processing from Step S1010 to Step S1060 illustrated in FIG. 7. Only a part of the processing procedure illustrated in FIG. 12 that is different from the processing procedure illustrated in FIG. 7 is described below, and description of the same part is omitted.

As illustrated in FIG. 12, if the controller 10 determines that the detection accuracy of the GPS receiver 18 has not been restored (No in Step S1050), the controller 10 makes the processing proceed to Step S1510. As Step S1510, the controller 10 determines whether the user has started continuous walking during a predetermined period of time. For example, if a determined movement state is changed from one of a stopping state and a motionless state to one of a walking state and a running state, the controller 10 determines that the user has started continuous walking (Yes in Step S1510). Then, the controller 10 starts counting the number of steps of the user, stores the counted number of steps as the number of steps of the user taken in the continuous walking in the storage 9, and then makes the processing proceed to Step S1520. On the other hand, if NO is determined in Step S1510, the controller 10 makes the processing proceed to Step S1040, and operates similarly thereafter.

As Step S1520, the controller 10 determines whether the number of steps stored in the storage 9 is equal to or more than the first threshold. If the controller 10 determines that the number of steps is less than the first threshold (No in Step S1520), the controller 10 makes the processing proceed to Step S1530. As Step S1530, the controller 10 determines whether the user has finished continuous walking. For example, if a determined movement state is changed from one of a walking state and a running state to one of a stopping state and a motionless state, the controller 10 determines that the user has finished continuous walking (Yes in Step S1530). Then, the controller 10 finishes counting the number of steps of the user, and then makes the processing proceed to Step S1040. The controller 10 operates similarly thereafter. On the other hand, if NO is determined in Step S1530, the controller 10 makes the processing proceed to Step S1520, and operates similarly thereafter.

If the controller 10 determines that the number of steps is equal to or more than the first threshold (Yes in Step S1520), the controller 10 makes the processing proceed to Step S1060. If the controller 10 ends the processing of Step S1060, the controller 10 ends the processing procedure illustrated in FIG. 12.

One example illustrated in FIG. 12 describes a case where the electronic device 1a uses restoration of detection accuracy of the GPS receiver 18 as a condition for canceling reduction of communication, but this is not restrictive. For example, the electronic device 1a may not use restoration of detection accuracy of the GPS receiver 18 as the condition for canceling reduction of communication. In this case, for example, Step S1510 is executed subsequently to Step S1040 without execution of Step S1050.

In one example illustrated in FIG. 12, if continuous walking of the user is detected after deterioration of the detection accuracy of the GPS receiver 18 and the number of steps taken in the continuous walking reaches a predetermined number of steps or more, the electronic device 1a can cancel the reduction of communication of the communication unit 6 with another device. In other words, if continuous walking of the user is detected after deterioration of the detection accuracy of the GPS receiver 18, the electronic device 1a can reduce communication of the communication unit 6 with another device during a period of time in which the number of steps taken in the continuous walking is less than a predetermined number of steps.

Consequently, the electronic device 1a can provide a highly convenient method of communicating with another device.

The above describes a case where the electronic device 1a executes each of the processing procedures illustrated in FIG. 7 to FIG. 12 using the controller 10, but this is not restrictive. For example, the processing procedure illustrated in FIG. 7 to FIG. 12 may be a processing procedure in which those processing procedures are combined.

Next, a notification system 100 according to one example is described. The notification system 100 according to one example is the same as the notification system 100 illustrated in FIG. 4 above in which the electronic device 1 is replaced by the electronic device 1a. FIG. 4 hereinafter refers to FIG. 4 in which the electronic device 1 is replaced by the electronic device 1a.

For example, the user carrying the electronic device 1a is walking in an outdoor place (see FIG. 4). In this case, the user is a vulnerable road user who may have a traffic accident involving the vehicle 300 such as an automobile and a motorcycle. To protect a vulnerable road user, the electronic device 1a includes a function of notifying a driver of the vehicle 300 etc. about the presence of the user. The electronic device 1a can estimate that the user is in a dangerous outdoor place if the detection accuracy of the GPS receiver 18 does not deteriorate. If the electronic device 1a estimates that the user is not in a safe place, the electronic device 1a executes notification processing with respect to another external device.

As illustrated in FIG. 4, if the roadside unit 200 and the on-board device 310 capable of communication are present near the electronic device 1a, the electronic device 1a transmits a radio wave containing notification information D for giving notice of the presence of the user to the roadside unit 200 and the on-board device 310 by means of short-range wireless communication. As a result, the electronic device 1a can notify the roadside unit 200, the on-board device 310, etc. about the presence of the user, and can thus enhance safety of the user. On the other hand, if the on-board device 310 receives notification information D from the electronic device 1a carried by the user not in a safe place, the on-board device 310 can notify a driver that a pedestrian who may dangerously run out is present nearby, for example. As a result, the driver can enhance the probability of avoiding a traffic accident involving a vulnerable road user, such as a pedestrian and a person riding a bicycle. If the roadside unit 200 receives notification information D from the electronic device 1a carried by the user not in a safe place, the roadside unit 200 can transfer the notification information D to the vehicle 300), the on-board device 310, or the like that approaches the roadside unit 200, for example. As a result, the roadside unit 200 can contribute to avoiding a traffic accident involving the vehicle 300 and a vulnerable road user.

For example, the user carrying the electronic device 1a moves from an outdoor place and is inside a safe place in the building 500 such as a home and an office (see FIG. 4). In this case, the GPS receiver 18 of the electronic device 1a is located inside the building 500 where reception of signals from positioning satellites is poor, and therefore the detection accuracy deteriorates. The electronic device 1a can reduce communication of the communication unit 6 with another device if the electronic device 1a detects deterioration of the detection accuracy of the GPS receiver 18. The electronic device 1a does not execute notification processing with respect to another device if the electronic device 1a reduces communication of the communication unit 6 with another device. As a result, the electronic device 1a does not activate the communication unit 6, and can thus reduce power consumption. At the same time, the on-board device 310 does not receive notification from the electronic device 1a carried by the user in a safe place, and thus the probability that a driver is provided with unnecessary information can be reduced.

The above describes a case where the electronic device 1a controls communication of the communication unit 6 with another device based on the detection accuracy of the GPS receiver 18, but this is not restrictive. For example, the electronic device 1a may estimate whether the user is in a safe place based on the detection accuracy of the GPS receiver 18 and the position where the detection accuracy deteriorated. In this case, the electronic device 1 may estimate that the user is in a safe place if the electronic device 1 detects deterioration of the detection accuracy of the GPS receiver 18 and the position where the detection accuracy deteriorated is a preregistered position. Conceivable examples of the preregistered position include the positions of a home and an office of the user.

The above describes a case where the electronic device 1a does not execute notification processing with respect to another device if the electronic device 1a reduces communication of the communication unit 6 with another device, but this is not restrictive. For example, the electronic device 1a repeatedly executes communication of the communication unit 6 with another device on a regular basis. In this case, the electronic device 1a may decrease the number of times of execution of notification to another device in unit time in the notification processing with respect to another device if the electronic device 1a reduces communication of the communication unit 6 with another device. As another example, for example, the electronic device 1a may reduce a data amount that is transmitted in the notification processing with respect to another device if the electronic device 1a reduces communication of the communication unit 6 with another device.

In the above example, a GPS receiver is exemplified as a position detector that detects position information of the subject device based on signals output from satellites, but another unit that detects position information of the subject device based on signals output from positioning satellites other than GPS satellites may be used. Examples of the positioning satellites other than GPS satellites include positioning satellites such as Global Navigation Satellite System (GLONASS), Indian Regional Navigational Satellite System (IRNSS), COMPASS, and GALILEO.

Characteristic embodiments have been described for the purpose of completely and clearly disclosing technology relating to the attached claims. The attached claims, however, should not be limited to the above embodiments, and should be configured such that all the modifications and alternative configurations that may be created by a person skilled in the art in the relevant technical field be embodied within the scope of the basic matters described herein.

The invention claimed is:
1. An electronic device comprising:
a position detector configured to detect position information of the electronic device based on a signal output by a satellite;
a communication unit configured to communicate with another device; and
at least one processor configured to:
determine that detection accuracy corresponding to the position information detected by the position detector has deteriorated, when it is determined that the detection accuracy has deteriorated, determine that the position information matches a preregistered position, and reduce communication with the another device.

2. The electronic device according to claim 1, further comprising at least one sensor; and wherein when the at least one processor determines that a user of the electronic device is in a state of riding a conveyance based on information acquired by the at least one sensor, the at least one processor reduces communication with the another device even when the detection accuracy of the position detector does not deteriorate.

3. The electronic device according to claim 1, further comprising at least one sensor; and wherein when the at least one processor detects continuous walking of a user of the electronic device based on information acquired by the at least one sensor when the at least one processor determines that the detection accuracy of the position detector has deteriorated, the at least one processor reduces communication with the another device during a period of time in which the number of steps taken in the continuous walking is less than a predetermined number of steps.

4. The electronic device according to claim 1, wherein when the at least one processor determines that the detection accuracy of the position detector has been restored when the at least one processor determines that the detection accuracy of the position detector has deteriorated, the at least one processor cancels the reduction of communication with the another device.

5. The electronic device according to claim 1, further comprising at least one sensor; and wherein when the at least one processor detects a number of steps and a direction of a user of the electronic device based on information acquired by the at least one sensor, and determines that the user has reached a predetermined position based on the detected number of steps and direction when the at least one processor determines that the detection accuracy of the position detector has deteriorated, the at least one processor cancels the reduction of communication with the another device.

6. The electronic device according to claim 1, further comprising at least one sensor; and wherein when the at least one processor detects predetermined temperature change based on temperature information acquired by the at least one sensor when the at least one processor determines that the detection accuracy of the position detector has deteriorated, the at least one processor cancels the reduction of communication with the another device.

7. A control method of an electronic device comprising a position detector and a communication unit, the control method comprising:

detecting position information of the electronic device using the position detector, and based on a signal output by a satellite;

determining that detection accuracy corresponding to the position information detected by the position detector has deteriorated;

when it is determined that the detection accuracy has deteriorated, determine that the position information matches a preregistered position; and reducing communication of the communication unit with another device.

8. A non-transitory computer-readable recording medium that stores a control program, the control program configured to control an electronic device, comprising a position detector and a communication unit, to execute processes of:

detecting position information of the electronic device using the position detector, and based on a signal output by a satellite;

determining that detection accuracy corresponding to the position information detected by the position detector has deteriorated;

when it is determined that the detection accuracy has deteriorated, determine that the position information matches a preregistered position; and reducing communication of the communication unit with another device.

* * * * *